United States Patent
Hasegawa

(10) Patent No.: US 10,460,421 B2
(45) Date of Patent: Oct. 29, 2019

(54) IMAGE PROCESSING APPARATUS AND STORAGE MEDIUM

(71) Applicant: Brother Kogyo Kabushiki Kaisha, Nagoya-shi, Aichi-ken (JP)

(72) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 168 days.

(21) Appl. No.: 14/466,480

(22) Filed: Aug. 22, 2014

(65) Prior Publication Data

US 2015/0055887 A1 Feb. 26, 2015

(30) Foreign Application Priority Data

Aug. 23, 2013 (JP) .................................. 2013-173697

(51) Int. Cl.
*G06T 3/40* (2006.01)
*G06T 11/00* (2006.01)
*G06T 3/00* (2006.01)

(52) U.S. Cl.
CPC .................. *G06T 3/40* (2013.01); *G06T 3/00* (2013.01); *G06T 11/00* (2013.01)

(58) Field of Classification Search
None
See application file for complete search history.

(56) References Cited

U.S. PATENT DOCUMENTS

| | | | | |
|---|---|---|---|---|
| 8,005,316 B1* | 8/2011 | Linburn | ............... | G11B 27/034 345/1.1 |
| 2005/0225566 A1* | 10/2005 | Kojo | ...................... | G06T 13/80 345/629 |
| 2006/0033820 A1* | 2/2006 | Honda | ................... | H04N 5/272 348/218.1 |
| 2009/0142001 A1* | 6/2009 | Kuniyuki | ............. | H04N 1/3872 382/284 |
| 2011/0285748 A1* | 11/2011 | Slatter | ..................... | G06T 11/60 345/629 |
| 2012/0327127 A1* | 12/2012 | Fukuda | ................ | H04N 1/3875 345/668 |

(Continued)

FOREIGN PATENT DOCUMENTS

| | | |
|---|---|---|
| JP | 2005-094423 A | 4/2005 |
| JP | 2007-235189 A | 9/2007 |
| JP | 2008188177 A * | 8/2008 |

(Continued)

*Primary Examiner* — Jiangeng Sun
(74) *Attorney, Agent, or Firm* — Banner & Witcoff, Ltd.

(57) ABSTRACT

An image processing apparatus configured having processor and a memory and configured to perform: calculating a size ratio between an inscribed figure inscribed in a composition target area in a template image and an area determined based on an object in a target image; setting a first area including the object to the target image based on the size ratio; and generating a composited image in which an image in the first area whose size has been adjusted based on the size ratio is composited in the composition target area, wherein the first area is set such that, when the image in the first area is superimposed on the composition target area, the object contacts with the inscribed figure and an outer edge of the first area matches a circumscribed figure circumscribed to the composition target area.

12 Claims, 22 Drawing Sheets

(56) References Cited

U.S. PATENT DOCUMENTS

2014/0010477 A1* 1/2014 Kotani ................. G06T 3/40
  382/298
2014/0063512 A1* 3/2014 Takeuchi ........... G06K 15/1843
  358/1.2

FOREIGN PATENT DOCUMENTS

| JP | 2009-237618 A | 10/2009 |
| JP | 2013-120954 A | 6/2013 |

* cited by examiner

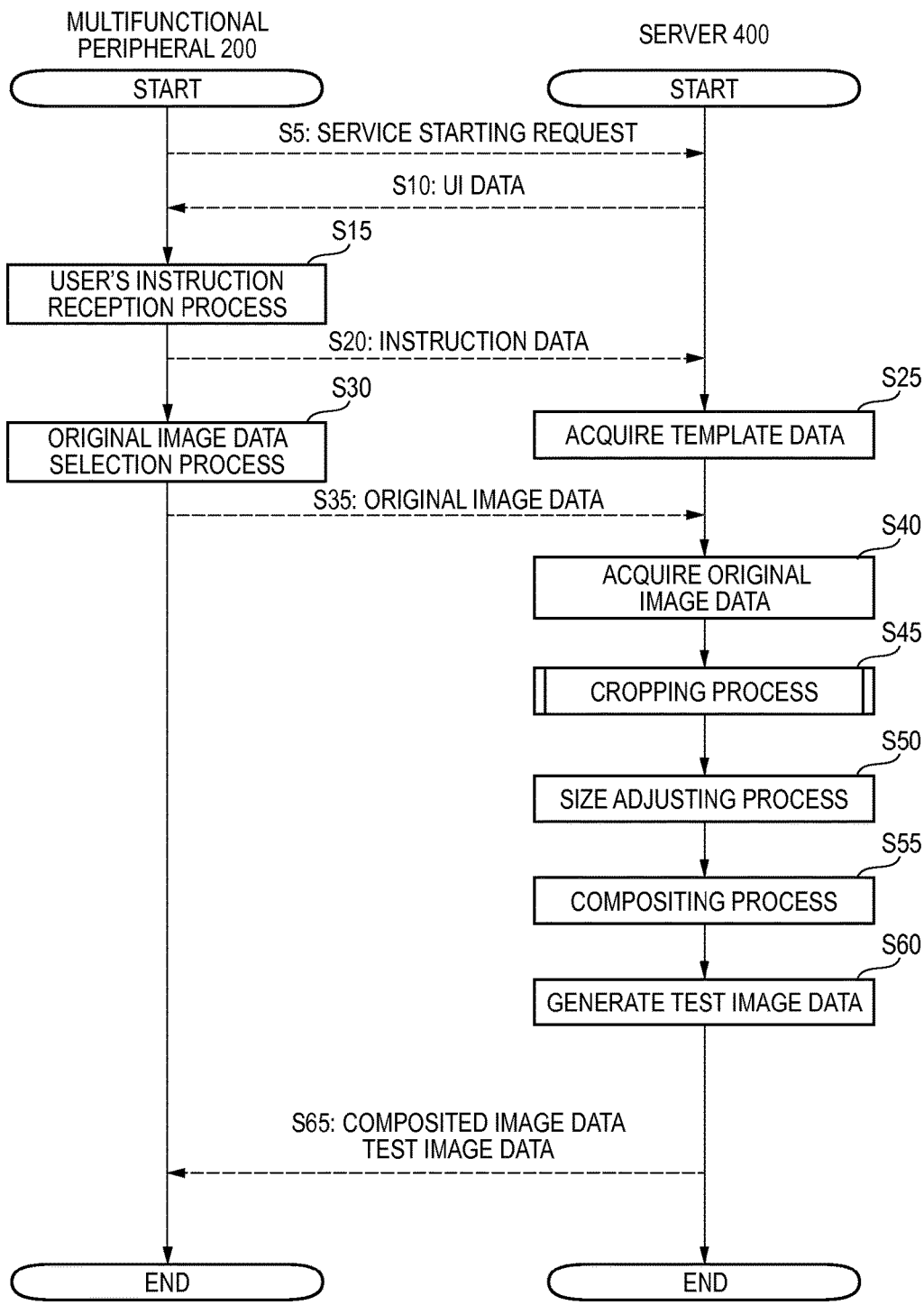

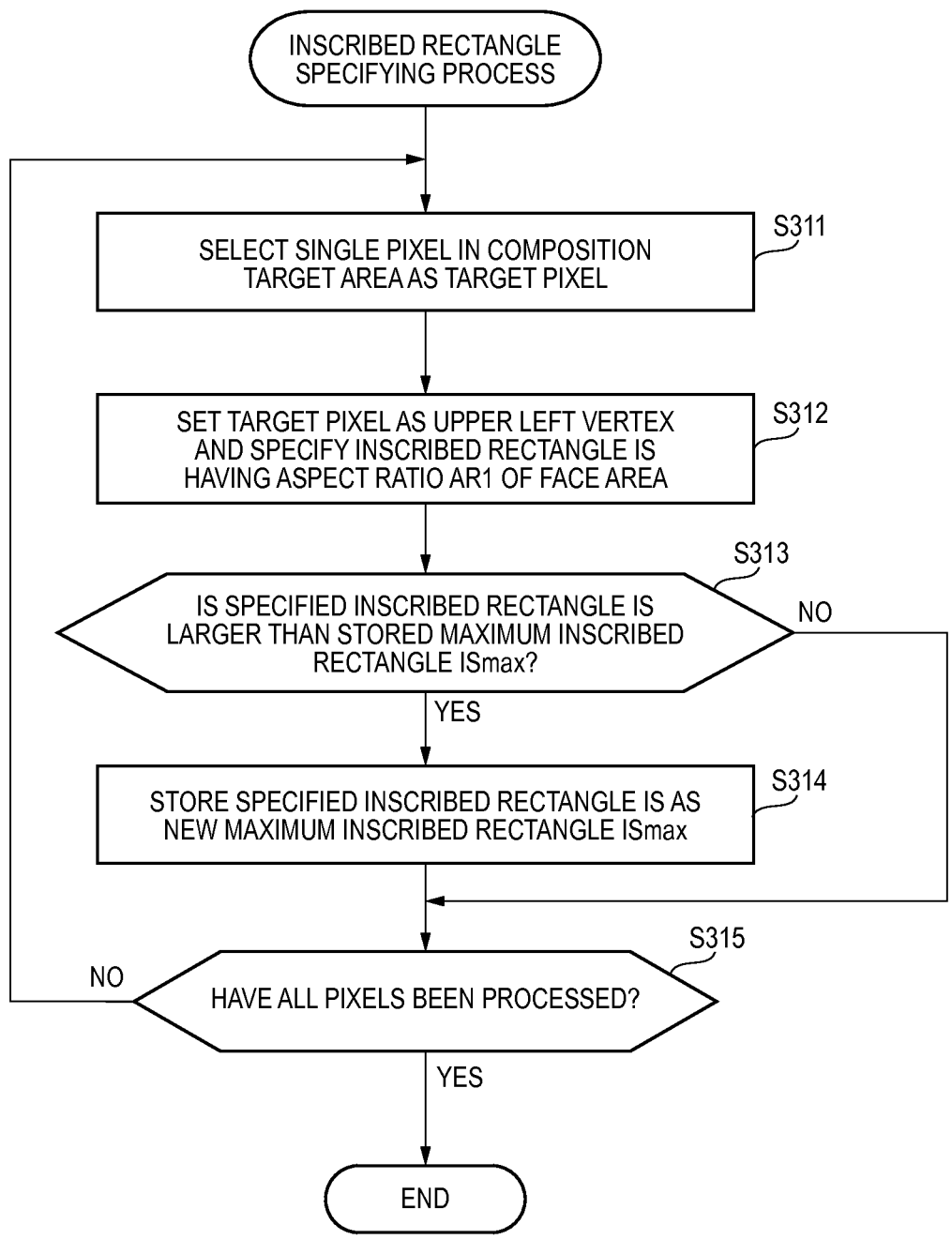

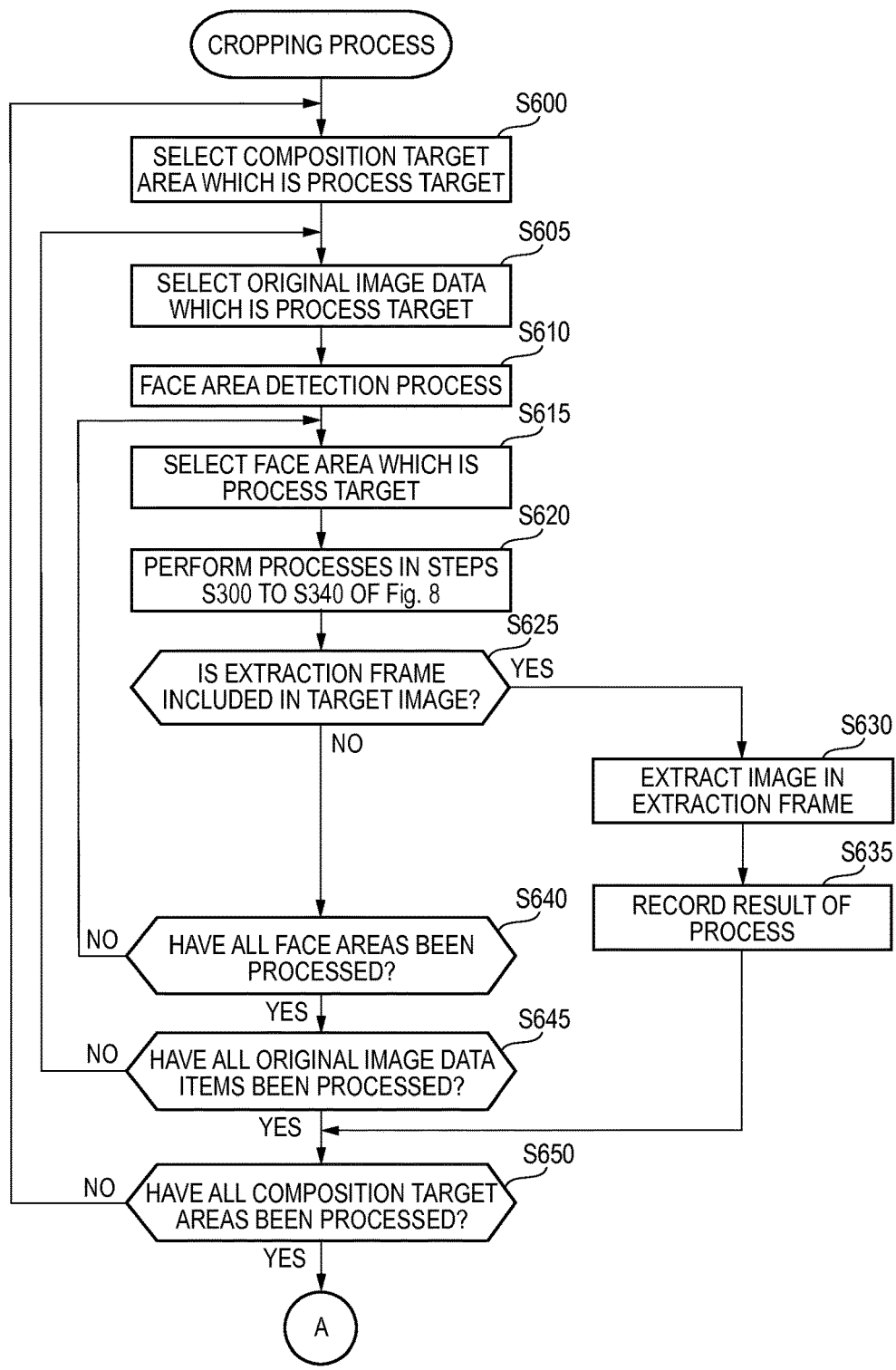

| COMPOSITION TARGET AREA | RECTANGULAR IMAGE | |
| --- | --- | --- |
| | ORIGINAL IMAGE | FACE AREA |
| AREA 15A | ORIGINAL IMAGE 20 | FACE AREA FA6 |
| AREA 15B | ORIGINAL IMAGE 17 | FACE AREA FA2 |
| AREA 15C | UNDETERMINED | UNDETERMINED |

MODIFICATION EXAMPLE

IMAGE PROCESSING APPARATUS AND STORAGE MEDIUM

CROSS-REFERENCE TO RELATED APPLICATIONS

This application claims priority from Japanese Patent Application No. 2013-173697 filed on Aug. 23, 2013, the entire contents of which are incorporated herein by reference.

TECHNICAL FIELD

Aspects of the present invention relate to an image processing technique, and particularly to an image processing technique of processing image data indicating an image including a face area.

BACKGROUND

A technique is known in which image data indicating a picture image and image data indicating a frame image including a picture border are composited with each other so as to generate a composited image data. In this technique, a processing apparatus specifies a face area including a face from a picture image by using image data indicating a picture image, and extracts an image in a predetermined range including the face area. The processing apparatus generates composited image data so that the extracted image in the predetermined range is included within a picture border of a frame image.

SUMMARY

However, in the technique, there is a probability that, depending on a shape of the picture border used, an image including a face area may not be appropriately composited with a picture border. This problem is not limited to the case where an image including a face area is composited with a picture border but is common to a case where an image including an object area is composited with a composition target area.

In view of the above, aspect of the present invention provide a novel technique for appropriately compositing an image including an object area with a composition target area.

Aspects of the present invention have been made in order to solve at least some of the above-described problems, and can be realized in the following application examples.

(1) An image processing apparatus including: a processor; and a memory storing instructions that, when executed by the processor, cause the image processing apparatus to perform: acquiring target image data indicating a target image, which is a target of an image processing, and template image data indicating a template image; specifying an object in the target image; specifying an inscribed figure inscribed in a composition target area in the template image and a circumscribed figure circumscribed to the composition target area, the composition target area having a shape different from both a shape of the inscribed figure and a shape of the circumscribed figure; calculating a size ratio between the specified inscribed figure and an area determined based on the object in the target image; setting a first area including the object to the target image based on the calculated size ratio; and generating a composited image in which an image, which is in the first area of the target image and whose size has been adjusted based on the size ratio, is composited in the composition target area in the template image, wherein the first area is set such that, when the image in the first area whose size has been adjusted based on the size ratio is superimposed on the composition target area, the object contacts with the inscribed figure and an outer edge of the first area matches an outline of the circumscribed figure.

According to the configuration, an image whose size has been adjusted based on a size ratio between an inscribed figure and an area set by using an object is composited. Accordingly, the object can be composited in an appropriate size regardless of a shape of a composition target area. In addition, an image in the first area, which is set so that the object contacts with the inscribed figure and an outer edge of the first area matches the outline of the circumscribed figure, is composited. As a result, the object can be composited at an appropriate position, and the image can be appropriately composited in the entire composition target area, regardless of a shape of the composition target area. Therefore, it is possible to appropriately composite an image including the object in the composition target area.

In addition, the present invention can be realized in various forms, and can be realized in forms such as an image processing method, a computer program for realizing functions or methods of the apparatus, and a storage medium storing the computer program thereon.

BRIEF DESCRIPTION OF DRAWINGS

FIG. 3 is a flowchart illustrating an operation of the image processing system of the first illustrative embodiment;

FIG. 10 is a flowchart illustrating an inscribed rectangle specifying process;

FIG. 18 is a flowchart illustrating a cropping process of a second illustrative embodiment;

DETAILED DESCRIPTION

A. First Illustrative Embodiment

A-1: Configuration of Image Processing System 1000

Figure 1:
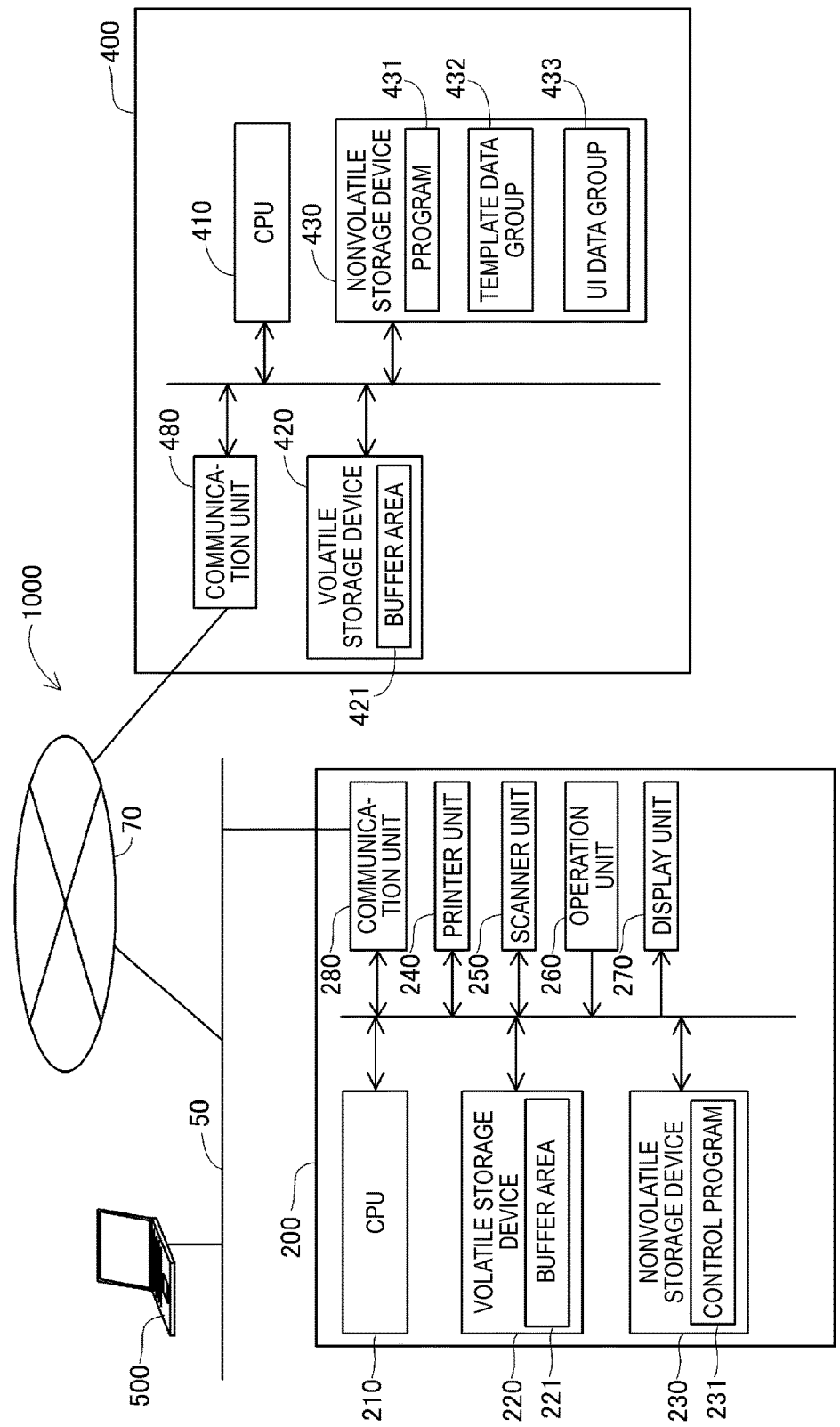
FIG. 1 is a block diagram illustrating a configuration of an image processing system of a first illustrative embodiment.

FIG. 1 is a block diagram illustrating a configuration of an image processing system 1000 in a first illustrative embodiment. The image processing system 1000 includes a server 400 serving as an image processing apparatus and a multifunctional peripheral 200. The server 400 is connected to the Internet 70, and the multifunctional peripheral 200 is connected to the Internet 70 via a local area network (LAN) 50. As a result, the server 400 and the multifunctional peripheral 200 can perform communication via the LAN 50 and the Internet 70. In addition, the LAN 50 may be connected to a personal computer 500 of a user of the multifunctional peripheral 200.

The server 400 includes a CPU 410, a volatile storage device 420 such as a DRAM, a nonvolatile storage device 430 such as a hard disk drive or a flash memory, and a communication unit 480 including an interface for connection to a network such as the Internet 70. The volatile storage device 420 is provided with a buffer area 421 which temporarily stores various intermediate data items generated when the CPU 410 performs a process. The nonvolatile storage device 430 stores a computer program 431, a template data group 432 including a plurality of template data items, and a UI data group 433 described later.

The computer program 431 is provided in a form of being stored on, for example, a DVD-ROM, and is installed in the server 400 by a manager of the server 400. The CPU 410 performs image processing described later by executing the computer program 431.

Figure 2A:
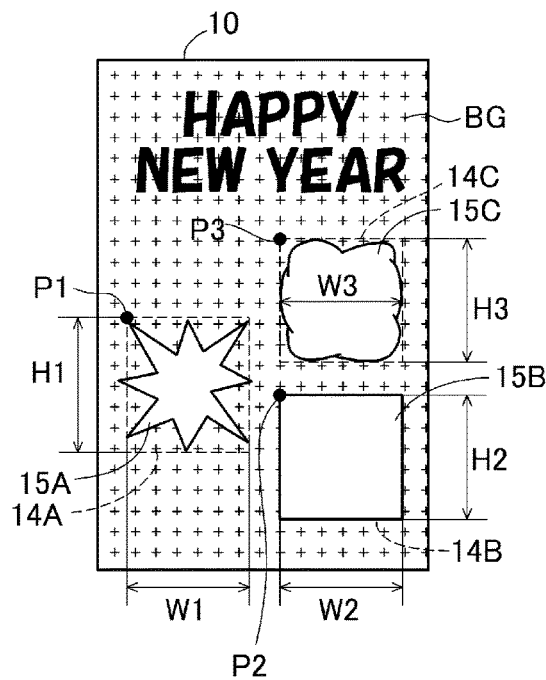
FIGS. 2A to 2C are diagrams illustrating an example of template data.
Figure 2B:
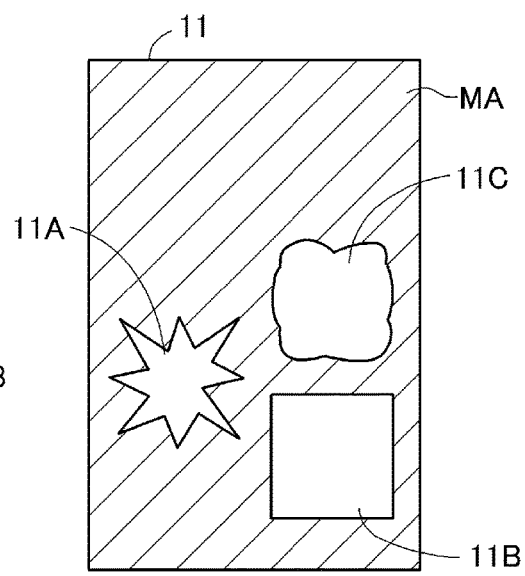
Figure 2C:
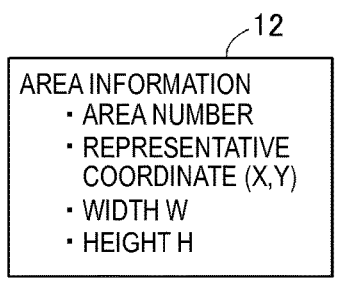

FIGS. 2A to 2C are diagrams illustrating an example of template data. A single template data item includes template image data indicating a template image 10 (FIG. 2A), mask image data indicating a mask image 11 (FIG. 2B), and area information 12. The template data is generated in a predetermined file format, for example, a portable network graphic (PNG) format.

The template image data is, for example, RGB image data. In the example of FIGS. 2A to 2C, the template image 10 includes a background image BG in which objects such as text or a pattern are designed, and three composition target areas 15A to 15C for compositing other images. The number, shapes and sizes of composition target areas, and design of the background image BG may be different for each template. The composition target areas are areas where a partial image of an original image described later is composited when a composited image is generated by using the template image 10, in an image processing described later.

The mask image 11 is an image for specifying the three composition target areas 15A to 15C in the template image 10. The mask image 11 has the same size (that is, the number of pixels in a vertical direction and the number of pixels in a horizontal direction) as that of the template image 10. A pixel in the mask image 11 has two values including a first value and a second value. The first value indicates that a corresponding pixel in the template image 10 is a pixel forming the background image BG. The second value indicates that a corresponding pixel in the template image 10 is a pixel forming the composition target areas 15A to 15C. For example, an alpha channel that defines transmittance for each pixel is used in the mask image data. In this case, for example, the first value is a value indicating that the transmittance of a pixel is 0% (for example, 255), that is, the pixel is opaque, and the second value is a value indicating that the transmittance of a pixel is 100% (for example, 0), that is, the pixel is transparent.

A hatched area MA in the mask image 11 is an area formed by a plurality of pixels having the first value. The area MA corresponds to the background image BG of the template image 10. Three areas 11A to 11C which are not hatched in the mask image 11 are areas formed by a plurality of pixels having the second value. The areas 11A to 11C correspond to the composition target areas 15A to 15C in the template image 10.

In addition, alternatively, in the mask image data, values of pixels of the areas 11A to 11C corresponding to the composition target areas 15A to 15C in the template image 10 may be area numbers (for example, 1 to 3) of corresponding composition target areas. Further, values of pixels in the area MA in the template image 10 corresponding to the background image BG may be a specific value (for example, 0) different from the area numbers.

The area information 12 is information regarding the composition target areas 15A to 15C. Specifically, the area information 12 includes area numbers as identifiers for identifying the composition target areas 15A to 15C, coordinates of representative points P1 to P3 of the composition target areas 15A to 15C, widths W1 to W3 (lengths in the horizontal direction), and heights H1 to H3 (lengths in the vertical direction). For example, a coordinate of an upper left vertex of each of circumscribed rectangles 14A to 14C, which are respectively circumscribed to the composition target areas 15A to 15C, is used as a coordinate of the representative point.

The multifunctional peripheral 200 includes a CPU 210, a volatile storage device 220 such as a DRAM, a nonvolatile storage device 230 such as a flash memory or a hard disk drive, a printer unit 240, a scanner unit 250, an operation unit 260 such as a touch panel or a button, a display unit 270 such as a liquid crystal display, and a communication unit 280 which performs communication with external apparatuses. For example, the communication unit 280 includes an interface for connection to a network such as the LAN 50, and an interface for connection to an external storage device (for example, a USB memory).

The volatile storage device 220 is provided with a buffer area 221 which temporarily stores various intermediate data items generated when the CPU 210 performs a process. The nonvolatile storage device 230 stores a control program 231.

The printer unit 240 performs printing by using a printing method such as an ink jet method or a laser method. The scanner unit 250 optically reads an original document by using a photoelectric conversion element (for example, a CCD or a CMOS) so as to generate scan data.

The CPU 210 performs control of the multifunctional peripheral 200 by executing the control program 231. For example, the CPU 210 controls the printer unit 240 or the scanner unit 250 so as to perform a copying process, a printing process, a scanning process, and the like. In addition, the CPU 210 may access the server 400 so as to perform a service use process of using a service provided by the server 400.

A-2: Operation of Image Processing System 1000

The CPU 410 of the server 400 performs an image processing of compositing an original image described later with the template image so as to generate a composited image in response to a request from the multifunctional peripheral 200 as a client. This image processing is performed in order to realize an image generation service which is provided to a client by the server 400. Hereinafter, description will be made of an operation of the image processing system 1000 including the image generation service provided by the server 400.

FIG. 3 is a flowchart illustrating an operation of the image processing system 1000 according to the first illustrative embodiment. A process in this flowchart is started when the multifunctional peripheral 200 receives an instruction for using the image generation service provided by the server 400, from a user. The image generation service is, specifically, a service of generating a composited image to be printed on a postcard (for example, a New Year's postcard) by using image data owned by the user. The image data owned by the user is, for example, image data indicating a picture captured by a digital still camera, and is image data which is compressed in a JPEG format, for example.

When the process is started, in step S5, the CPU 210 of the multifunctional peripheral 200 transmits a service starting request to the server 400. When the service starting request is received, the CPU 410 of the server 400 selects UI data which is necessary to provide the image generation service from the UI data group 433 (FIG. 1), and transmits the UI data to the multifunctional peripheral 200 (step S10). The UI data includes, for example, various image data items required to display a UI image and control data. The control data includes, for example, various data items required for the multifunctional peripheral 200 to perform predetermined processes (specifically, processes in steps S15, S20, S30 and S35 described later) by using the UI image. For example, the control data includes information indicating a process which is to be performed by the multifunctional peripheral 200, for example, a process of transmitting predetermined information to the server 400, based on a user's instruction received via a UI image (for example, FIGS. 4A and 4B).

In step S15, the CPU 210 performs a user's instruction reception process based on the received UI data. The user's instruction reception process is a process of receiving a user's instruction required for the server 400 to provide the image generation service from the user.

Figure 4A:
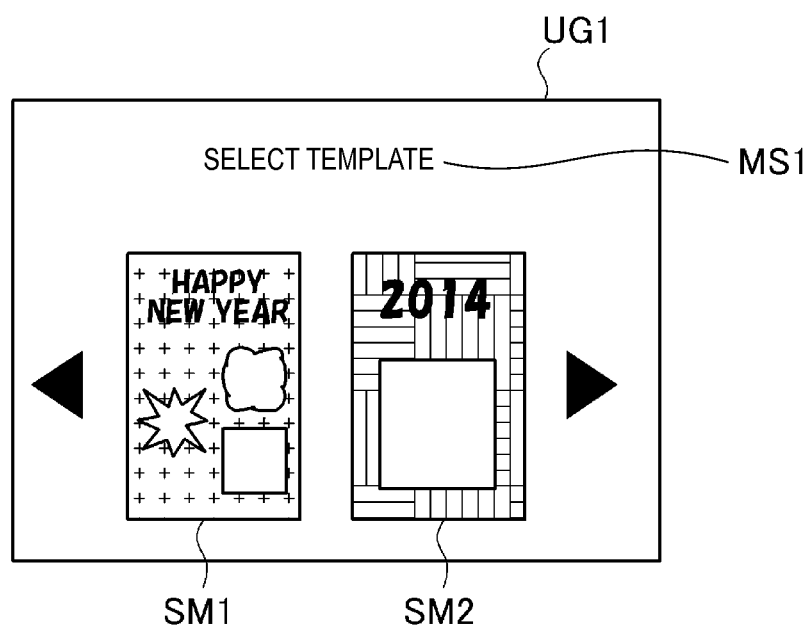
FIGS. 4A and 4B are diagrams illustrating examples of UI images.
Figure 4B:
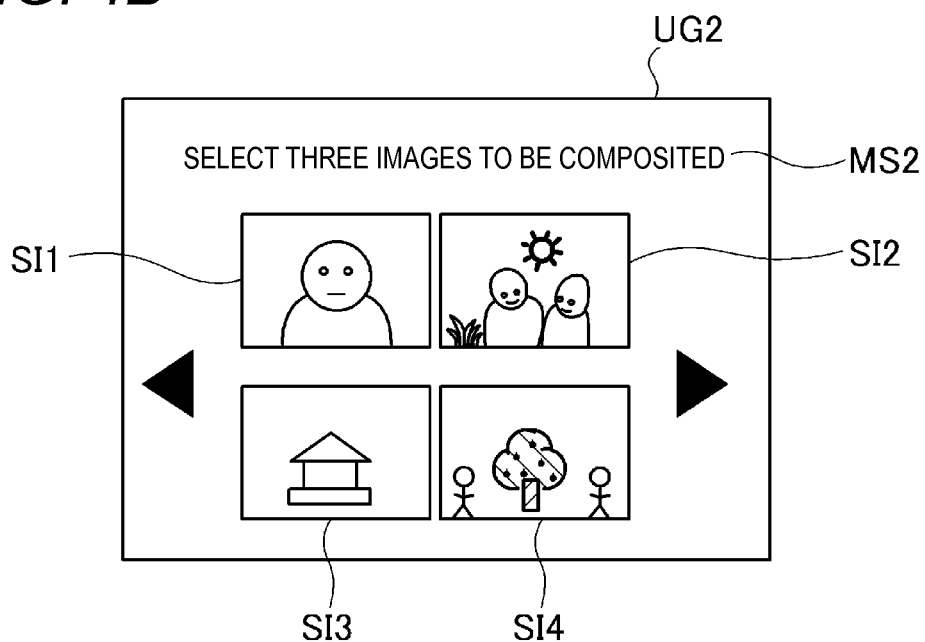

FIGS. 4A and 4B are diagrams illustrating examples of the UI image. First, the CPU 210 displays a UI image UG1 of FIG. 4A on the display unit 270, and receives selection of a template image to be used from the user. For example, the UI image UG1 includes a plurality of thumbnail images SM1 and SM2 representing a plurality of selectable template images, and a message MS1 for prompting the user to select a template image. An image data group indicated by the UI image UG1 or the thumbnail images SM1 and SM2 are included in the UI data received from the server 400. Next, the CPU 210 displays a predetermined UI image (not illustrated), and receives an operation mode of the image generation service from the user. In the present embodiment, the operation mode includes a "face extraction mode" and an "entirety extraction mode" as described later in detail. Depending on the operation modes, generated images are different even if a used template image and original image (described later) are the same.

In step S20, the CPU 210 transmits instruction data indicating an instruction received from the user to the server 400. The instruction data includes information for designating a template image selected by the user and information for designating an operation mode.

In step S25, the CPU 410 of the server 400 acquires template data corresponding to the template image selected by the user, from the template data group 432 (FIG. 1) stored in the nonvolatile storage device 430, based on the received instruction data. The template data may be acquired from external devices, for example, other servers or external storage devices connected to the server 400. In addition, the subsequent processes will be described by using a case where the template image 10 illustrated in FIG. 2 is selected by the user as an example.

Subsequent to transmission of the instruction data in step S20, the CPU 210 of the multifunctional peripheral 200 performs an original image data selection process (step S30). The original image data selection process is a process of selecting an image (also referred to as an original image) to be composited with the template image 10 based on the user's instruction. Specifically, the CPU 210 displays a UI image UG2 of FIG. 4B on the display unit 270, and receives selection of an original image to be used, from the user. For example, the UI image UG2 includes a plurality of thumbnail images SI1 to SI4 representing a plurality of selectable original images, and a message MS2 for prompting the user to select a template image. Image data items indicating the thumbnail images SI1 to SI4 are generated based on image data (also referred to as original image data) indicating original images.

The original image data is acquired from, for example, a storage device designated by the user. The designated storage device includes, for example, a removable medium such as a USB memory connected to the communication unit 280, an external hard disk drive, and the storage devices 220 and 230 provided in the multifunctional peripheral 200. The original image data of the present embodiment is, for example, image data owned by the user, specifically, image data which is generated by the user performing photographing by using a digital camera, or image data which is generated by using an image generation application or the like.

The CPU 210 receives selection of original images corresponding to the number of composition areas included in the template image to be used. For example, in a case where the template image 10 is used, the template image 10 includes the three composition target areas 15A to 15C for compositing other areas (FIG. 2A), and thus three original images are selected.

Figure 5A:
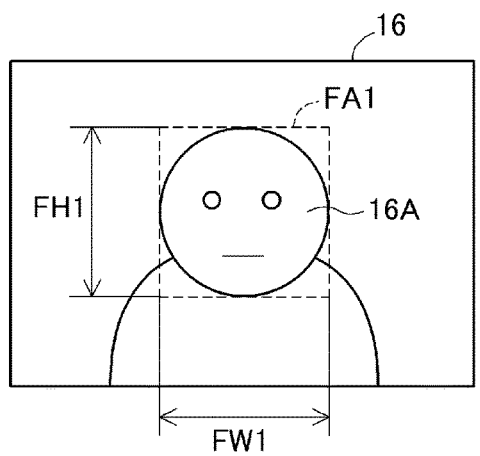
FIGS. 5A to 5D are diagrams illustrating examples of original images.
Figure 5B:
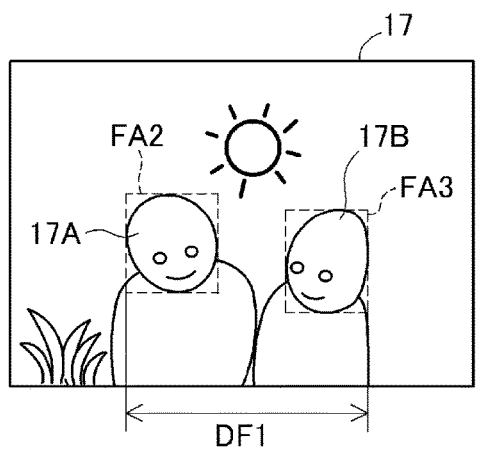
Figure 5C:
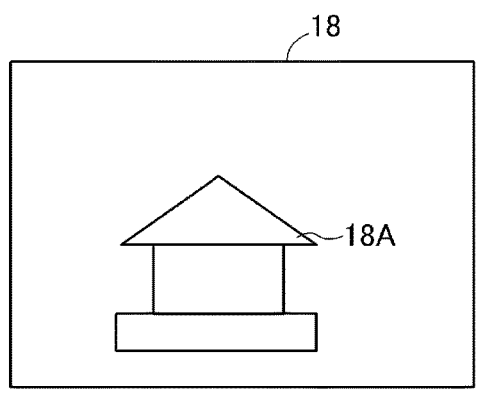
Figure 5D:
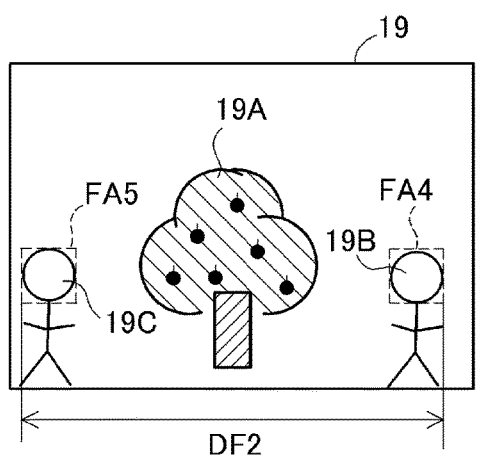

FIGS. 5A to 5D are diagrams illustrating examples of original images. The original images may include an image which includes a person's face as an object and an image which does not include a person's face. For example, an original image 16 of FIG. 5A includes a single face 16A, an original image 17 of FIG. 5B includes two faces 17A and 17B, and an original image 19 of FIG. 5D includes two faces 19B and 19C. An original image 18 of FIG. 5C does not include a person's face. The original images may include an object different from a person's face, for example, a building 18A (FIG. 5C) and a tree 19A (FIG. 5D). The subsequent processes will be described based on a case where three original images 16 to 18 are selected by the user as an example. However, for convenience of description, other original images will also be referred to as an example as appropriate.

If the original images are selected, in step S35, the CPU 210 transmits three original image data items indicating the three selected original images 16 to 18 to the server 400. At this time, the CPU 210 transmits information indicating an order in which the original images are selected by the user in correlation with the original image data items. Thus, the CPU 410 of the server 400 acquires the three original image data items and the information indicating the selection order (step S40). The three composition target areas 15A to 15C of the template image 10 have a predefined processing order, and an original image whose selection order is earlier is correlated with a composition target area whose processing order is earlier. In addition, in a case where information indicating the photographing date and time (time stamp) of an original image is correlated with original image data indicating the original image, an original image whose photographing date and time are earlier may be correlated with a composition target area whose processing order is earlier.

In step S45, the CPU 410 performs a cropping process. The cropping process is a process of extracting rectangular images including partial images to be composited in the three composition target areas 15A to 15C of the template image 10, from the three original images 16 to 18, respectively.

Figure 6:
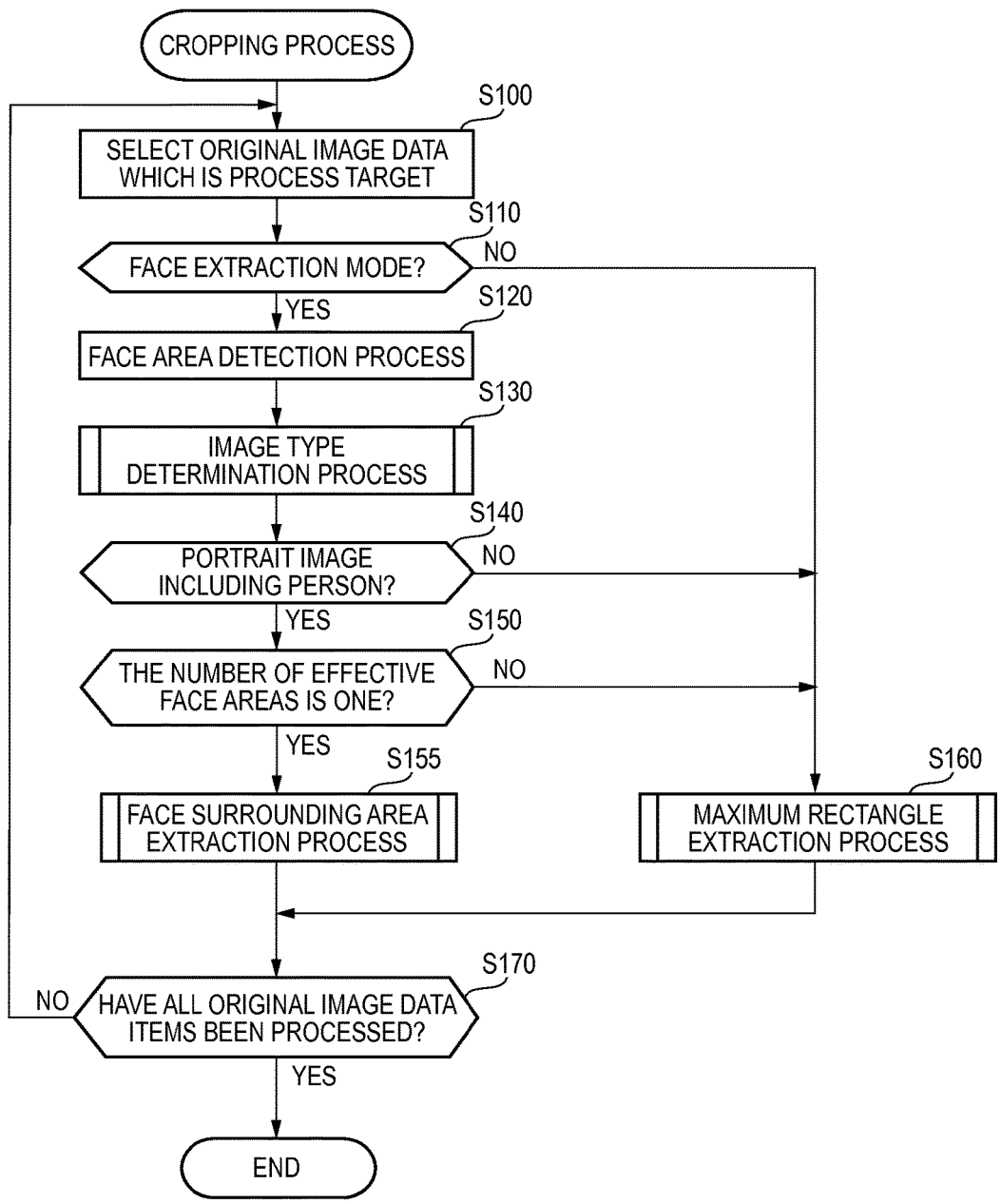
FIG. 6 is a flowchart illustrating a cropping process.

FIG. 6 is a flowchart of the cropping process. In step S100, the CPU 410 selects a single original image data item as image data (also referred to as target image data) which is a process target from the acquired original image data items.

In step S110, the CPU 410 determines whether an operation mode designated by the user is the face extraction mode or the entirety extraction mode. If an operation mode is the entirety extraction mode (step S110: NO), the CPU 410 performs a maximum rectangle extraction process (step S160) described later. If an operation mode is the face extraction mode (step S110: YES), the CPU 410 performs a face area detection process (step S120). The face extraction mode is an operation mode in which a partial image which is to be composited in a composition target area is changed based on a detection result of the face area FA. The entirety extraction mode is an operation mode in which a partial image which is to be composited in a composition target area is determined regardless of whether or not a face area FA is present.

The face area detection process is a process of detecting a face area FA present in an image (also referred to as a target image) indicated by the target image data. The face area FA is an area including a face of a person included in the target image. The face area detection process is performed by using a well-known method. For example, as for the face area detection process, a convolutional neural network is known in which, for example, features are detected from a low-order feature such as an edge to a high-order feature such as the eye or the mouth in a hierarchical manner, and a centroid position of a face or an outline of the face is finally detected (for example, see JP-A-2013-120954 and JP-A-2009-237618).

In the present embodiment, a circumscribed rectangle which is circumscribed to a face is detected as a face area. In other words, as a result of detection, information indicating a position and a size of a circumscribed rectangle which is circumscribed to a face is calculated. For example, a face area FA1 including a face 16A is detected from the original image 16 of FIG. 5A. Two face areas FA2 and FA3 including two faces 17A and 17B are detected from the original image 17 of FIG. 5B. Two face areas FA4 and FA5 including two faces 19B and 19C are detected from the original image 19 of FIG. 5D. A face area FA is not detected from the original image 18 of FIG. 5C. The face area FA which is a circumscribed rectangle circumscribed to a face is an example of "an area determined based on an object in a target image".

Subsequently to the face area detection process, in step S130, the CPU 410 performs an image type determination process.

Figure 7:
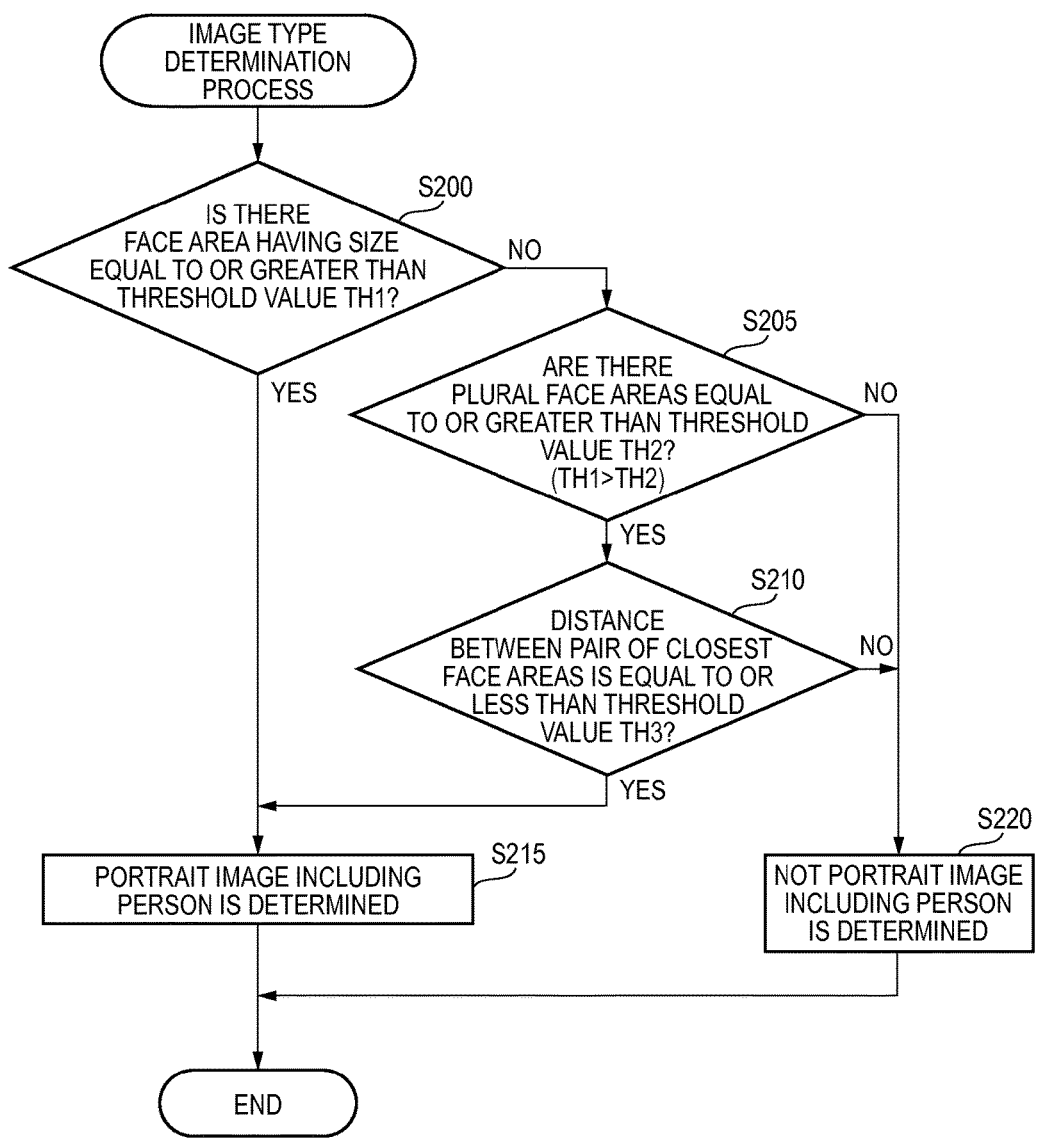
FIG. 7 is a flowchart illustrating an image type determination process.

FIG. 7 is a flowchart illustrating the image type determination process. The image type determination process is a process of determining whether a target image is a portrait image including a person or—an image different from a portrait image including a person. The portrait image including a person is an image in which a person is a main object. The image different for the portrait image including a person is an image in which an object different from a person is a main object. The object different from a person includes scenery, or an artifact such as a house or a car.

In step S200, the CPU 410 determines whether or not a face area FA having a size which is equal to or greater than a first threshold value TH1 is present in the target image. The first threshold value TH1 may be, for example, a composition of a threshold value of a height and a threshold value of a width, and may be a threshold value of an area. The face area FA in the target image has been detected in step S120 of FIG. 6. The first threshold value TH1 is set to, for example, a value which is smaller than a size of a face area which may be included in a portrait of a single person. The first threshold value TH1 is a set to, for example, a value which is greater than a size of a face area which may be included in a picture including a plurality of people (for example, a family picture or a group picture). Specifically, the size of a face area which may be included in a portrait of a single person is expected to be a size corresponding to about 6% of an area of the target image. The size of a face area which may be included in a picture including a plurality of people is expected to be a size corresponding to, for example, about 3% of an area of the target image.

For example, a size of the face area FA1 of the original image 16 of FIG. 5A is determined as being equal to or greater than the first threshold value TH1. Sizes of the face areas FA2 to FA5 of the original images 17 and 19 of FIGS. 5B and 5D are determined as being smaller than the first threshold value TH1.

If there is a face area FA having a size equal to or greater than the first threshold value TH1 (step S200: YES), the CPU 410 determines that the target image is a portrait image including a person (step S215). For example, it is determined that the original image 16 of FIG. 5A is a portrait image including a person.

If there is no face area FA having a size equal to or greater than the first threshold value TH1 (step S200: NO), the CPU 410 determines whether or not there are two or more face areas FA having a size equal to or greater than a second threshold value TH2 which is less than the first threshold value TH1 (step S205). The second threshold value TH2 is set to, for example, a value which is lower than a size of a face area which may be included in a picture including a plurality of people (for example, a family picture or a group picture). For example, it is determined that sizes of the face areas FA2 to FA5 of the original images 17 and 19 of FIGS. 5B and 5D are equal to or greater than the second threshold value TH2.

If there are not two or more face areas FA having a size equal to or greater than the second threshold value TH2 (step S205: NO), the CPU 410 determines that the target image is an image different from a portrait image including a person (step S220).

If there are two or more face areas FA having a size equal to or greater than the second threshold value TH2 (step S205: YES), the CPU 410 determines whether or not a distance DF between two face areas forming a pair of closest face areas (hereinafter, also referred to as a "closest pair") is equal to or less than a third threshold value TH3 (step S210). The closest pair is a pair formed by two face areas FA whose mutual distances are the shortest among two or more face areas FA having a size equal to or greater than the second threshold value TH2. As a distance between the two face areas FA, for example, a horizontal distance between a right end of a right face area FA and a left end of a left face area FA of the two face areas FA is used. FIG. 5B illustrates a distance DF1 between the face area FA2 and the face area FA3 in the original image 17. FIG. 5D illustrates a distance DF2 between the face area FA4 and the face area FA5 in the original image 19. The third threshold value TH3 is set to, for example, a length corresponding to ⅓ of a horizontal length (width) of the target image.

If the distance DF is equal to or less than the third threshold value TH3 (step S210: YES), the CPU 410 determines that the target image is a portrait image including a person (step S215). If the distance DF is greater than the third threshold value TH3 (step S210: NO), the CPU 410 determines that the target image is an image different from a portrait image including a person (step S220).

If the distance DF is relatively short, it is considered that there is a high probability that the target image is an image in which a plurality of people are main objects, for example, a family picture or a group picture. On the other hand, if the distance DF is relatively long, there is a high probability that people in the target image are not main objects of the target image. Specifically, the people in the target image may be people who are accidentally reflected at end parts in the target image when an object other than the people is photographed. For example, it is determined that the original image 17 of FIG. 5B is a portrait image including a person since the distance DF1 between the face area FA2 and the face area FA3 is relatively short. In addition, it is determined that the original image 19 of FIG. 5D is an image different from a portrait image including a person since the distance DF2 between the face area FA4 and the face area FA5 is relatively long.

According to the above-described image type determination process, the type of target image can be appropriately determined based on the number and sizes of face areas FA in the target image, and positions of face areas (specifically, a distance between two face areas). After it has been determined whether the target image is a portrait image including a person or an image different from a portrait image including a person, the image type determination process is finished.

Referring to FIG. 6 again, if it is determined that the target image is a portrait image including a person in the image type determination process (step S140: YES), the CPU 410 determines whether or not the number of effective face areas FA in the target image is one (step S150). Here, the effective face area FA is the face area FA which is taken into consideration in the above-described image type determination process (step S130). Therefore, at least one effective face area FA is present in the target image which has been determined as being a portrait image including a person.

If the number of effective face areas FA is one (step S150: YES), the CPU 410 performs a face surrounding area extraction process (step S155). The face surrounding area extraction process is a process of extracting a rectangular image which is used in a compositing process from the target image so that the target image is appropriately composited in a composition target area with which the target image is to be composited in the compositing process (step S55 of FIG. 3) described later. Hereinafter, the face surrounding area extraction process will be described by using a case where the target image is the original image 16 of FIG. 5A, and a composition target area with which the target image is to be composited is the composition target area 15A of FIG. 2A, as an example.

Figure 8:
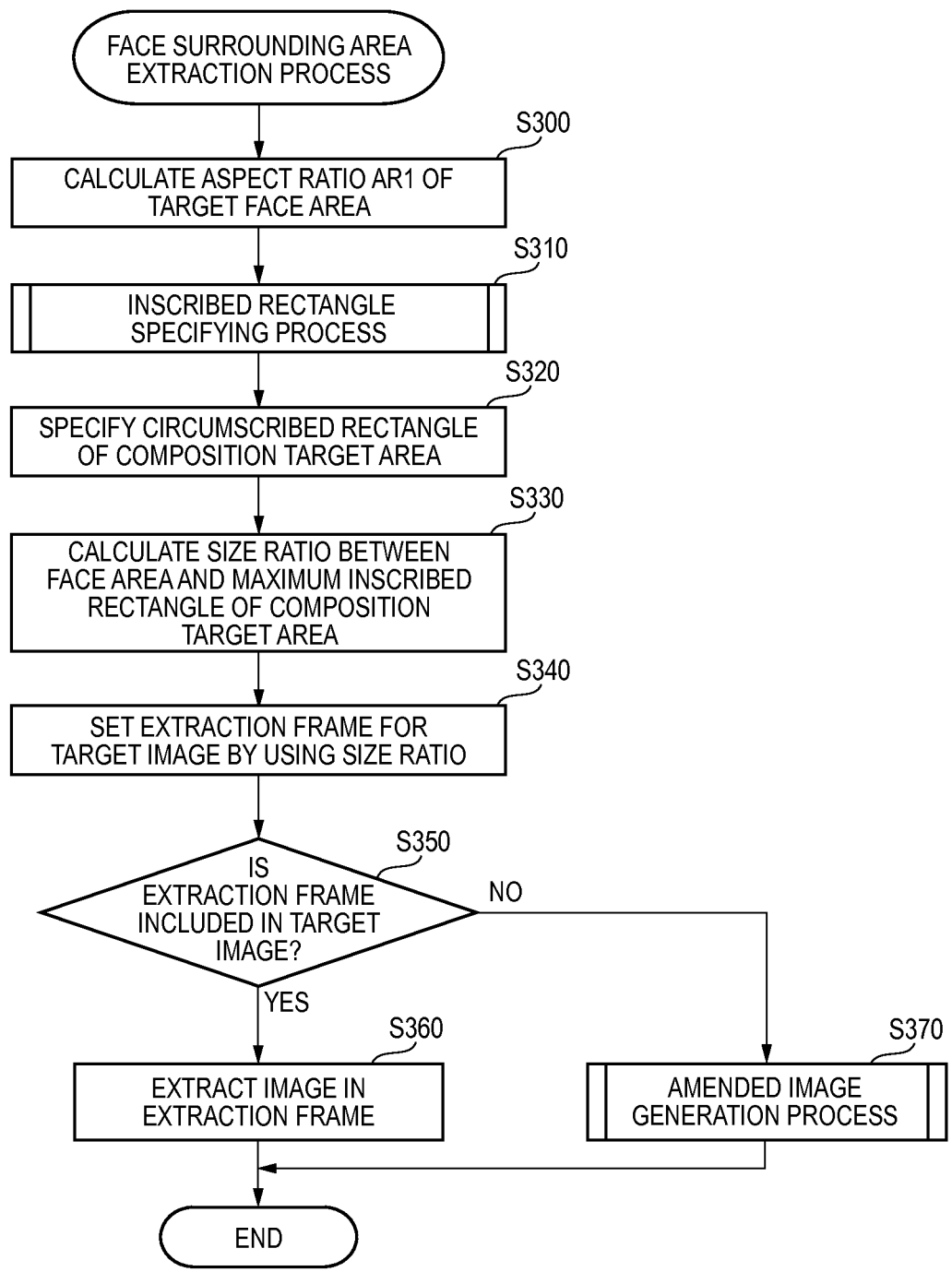
FIG. 8 is a flowchart illustrating a face surrounding area extraction process.
Figure 9:
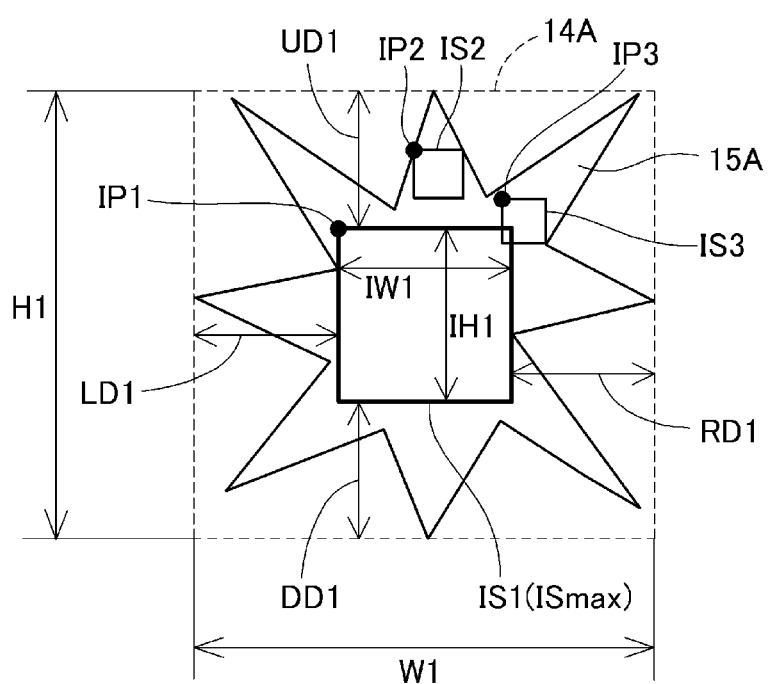
FIG. 9 is a diagram illustrating a shape of a composition target area.

FIG. 8 is a flowchart illustrating the face surrounding area extraction process. FIG. 9 is a diagram illustrating a shape of the composition target area 15A. In step S300, the CPU 410 calculates an aspect ratio AR1 of the face area FA1 in the target image. The aspect ratio is a ratio H/W of a vertical length (height) H to a horizontal length (width) W. Therefore, the aspect ratio AR1 of the face area FA1 in the original image 16 is FH1/FW1 (FIG. 5A).

In step S310, the CPU 410 performs an inscribed rectangle specifying process. This process is a process of specifying a maximum inscribed rectangle (hereinafter, referred to as a maximum inscribed rectangle ISmax) which has the aspect ratio AR1 of the face area FA1 (FIG. 5A) and is inscribed in a contour of the composition target area 15A.

FIG. 10 is a flowchart illustrating the inscribed rectangle specifying process. In step S311, the CPU 410 selects a single pixel in the composition target area 15A as a target pixel. A pixel in the composition target area 15A can be specified by referring to the mask image 11 (FIG. 2B).

In step S312, the CPU 410 specifies an inscribed rectangle IS which has the target pixel as an upper left vertex, has the aspect ratio AR1 of the face area FA1 (FIG. 5A), and is inscribed in the contour of the composition target area 15A. Specifically, the CPU 410 enlarges a minute rectangle which has the target pixel as an upper left vertex and has the aspect ratio AR1 until the rectangle is inscribed in the contour of the composition target area 15A while maintaining a position of the upper left vertex and the aspect ratio AR1. In other words, the CPU 410 enlarges the minute rectangle while sequentially increasing a vertical distance and a horizontal distance of the minute rectangle. The CPU 410 specifies a rectangle which is enlarged so as to be inscribed in the composition target area 15A as the inscribed rectangle IS.

FIG. 9 illustrates inscribed rectangles IS1 to IS3 which are specified in step S312 when three pixels IP1 to IP3 in the composition target area 15A are target pixels.

In step S313, the CPU 410 determines whether or not the specified inscribed rectangle IS is larger than the maximum inscribed rectangle ISmax which is currently stored. If the inscribed rectangle IS is larger than the maximum inscribed rectangle ISmax (step S313: YES), the CPU 410 stores the inscribed rectangle IS in the buffer area 421 as a new maximum inscribed rectangle ISmax (step S314). If the inscribed rectangle IS is equal to or smaller than the maximum inscribed rectangle ISmax (step S313: NO), the CPU 410 skips step S314.

In step S315, the CPU 410 determines whether or not all pixels in the composition target area 15A have been processed as target pixels. If there is an unprocessed pixel (step S315: NO), the CPU 410 returns to step S311, selects the unprocessed pixel as a target pixel, and repeatedly performs the above-described processes in steps S312 to S314. If all the pixels in the composition target area 15A have been processed (step S315: YES), the inscribed rectangle specifying process is finished. A maximum inscribed rectangle ISmax which is stored in the buffer area 221 at the time when the inscribed rectangle specifying process is finished is finally specified.

An upper left vertex of a maximum inscribed rectangle ISmax to be specified is necessarily present in the composition target area 15A. In addition, the number of inscribed rectangles IS which have an upper left pixel as a target pixel, have the aspect ratio AR1, and are inscribed in the contour of the composition target area 15A, is one. For this reason, if an inscribed rectangle IS is specified for each target pixel by using all the pixels in the composition target area 15A as target pixels, a maximum rectangle among a plurality of specified inscribed rectangles IS is a maximum inscribed rectangle ISmax to be specified.

In the example of FIG. 9, the description will be continued assuming that an inscribed rectangle IS1 corresponding to a pixel IP1 is a maximum inscribed rectangle ISmax. In subsequent step S320 (FIG. 8), the CPU 410 specifies a circumscribed rectangle 14A of the composition target area 15A. The circumscribed rectangle 14A is easily specified based on the area information 12.

In step S330, the CPU 410 calculates a size ratio SR of a size of the face area FA1 in the target image and a size of the maximum inscribed rectangle of the composition target area. In a case where the target image is the original image 16, there is a calculation of a size ratio SR1 of a size of the face area FA1 in the original image 16 (FIG. 5A) and a size of the maximum inscribed rectangle ISmax of the composition target area 15A (FIG. 9). As the size ratio SR1, a ratio (FW1/IW1) of a width FW1 of the face area FA1 to a width IW1 of the maximum inscribed rectangle ISmax, or a ratio (FH1/IH1) of a height FH1 of the face area FA1 to a height IH1 of the maximum inscribed rectangle ISmax is used. As described above, the face area FA1 and the maximum inscribed rectangle ISmax are homothetic rectangles having the same aspect ratio AR1, and thus (FW1/IW1) is the same as (FH1/IH1).

Figure 11A:
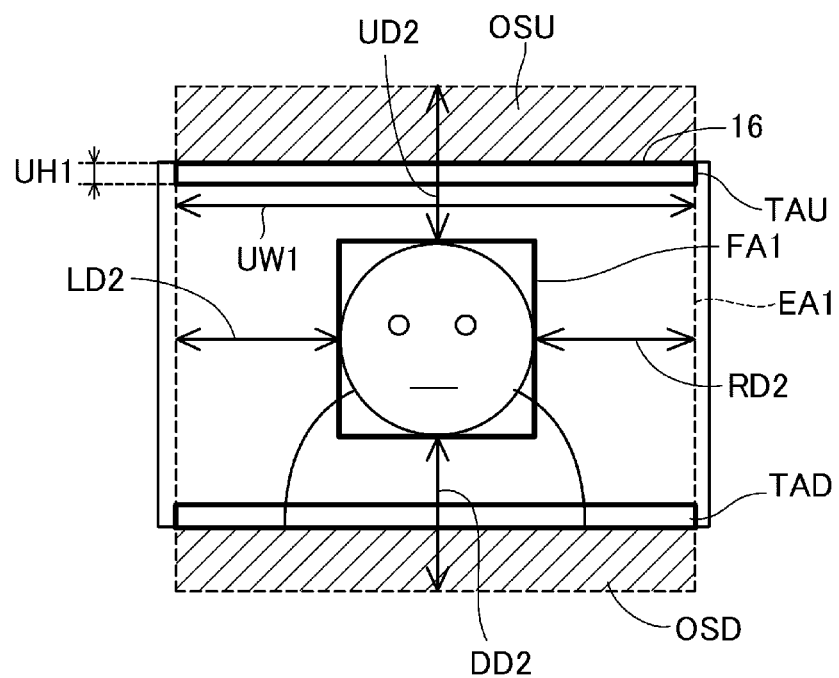
FIGS. 11A and 11B are diagrams illustrating that an extraction frame is set for a target image.
Figure 11B:
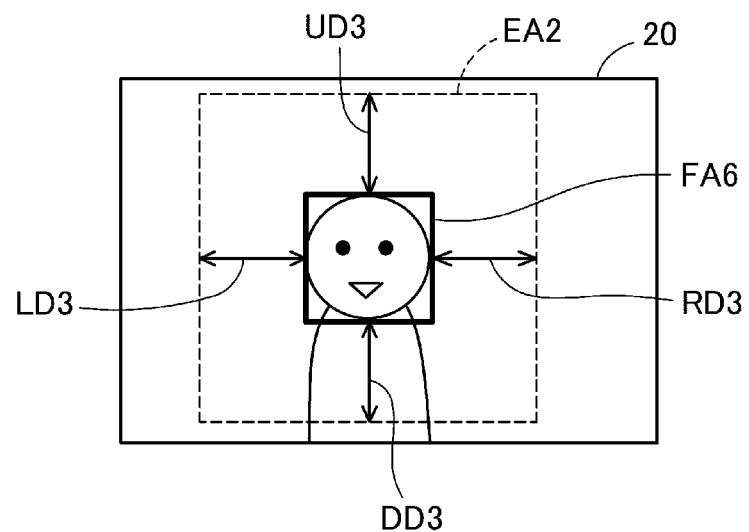

In step S340, the CPU 410 sets an extraction frame EA in the target image by using the size ratio SR. FIGS. 11A and 11B are diagrams illustrating the setting of the extraction frame EA in the target image. In a case where the target image is the original image 16 (FIG. 11A), the CPU 410 calculates a value (RD1×SR1) obtained by multiplying a distance RD1 (FIG. 9) from a right side of the maximum inscribed rectangle ISmax to a right side of the circumscribed rectangle 14A in the composition target area 15A by the size ratio SR1. The CPU 410 determines a position of a right side of the extraction frame EA1 so that the calculated value (RD1×SR1) becomes the same as a distance RD2 (FIG. 11A) from a right side of the face area FA1 to a right side of the extraction frame EA1 in the original image 16 (RD2=RD1×SR1).

Similarly, the CPU 410 calculates a distance LD2 from a left side of the face area FA1 to a left side of the extraction frame EA1, a distance UD2 from an upper side of the face area FA1 to an upper side of the extraction frame EA1, and a distance DD2 from a lower side of the face area FA1 to a lower side of the extraction frame EA1, respectively (LD2=LD1×SR1, UD2=UD1×SR1, and DD2=DD1×SR1). Here, LD1, UD1, and DD1 are respectively distances from the left side, upper side and lower side of the maximum inscribed rectangle ISmax to the left side, upper side and lower side of the circumscribed rectangle 14A in the composition target area 15A (FIG. 9). Then, the CPU 410 determines positions of the left side, upper side and lower side of the extraction frame EA1 based on the distances LD2, UD2 and DD2 (FIG. 11A). As a result, the extraction frame EA1 indicated by a dashed line in FIG. 11A is set for the original image 16 which is the target image.

In step S350, the CPU 410 determines whether or not the set extraction frame EA is included in the target image. For example, in the example of FIG. 11A, the extraction frame EA1 is not included in the original image 16. In other words, the extraction frame EA1 includes external areas OSU and OSD (hatched parts in FIG. 11A) which are located further outward than the original image 16. FIG. 11B illustrates an example of a case where the extraction frame EA is included in the target image. In an original image 20 which is the target image, a relatively small face area FA6 is located near a center of the original image 20. For this reason, in step S340, an extraction frame EA2 set for the original image 20 is included in the original image 20. Distances RD3, LD3, UD3, and DD3 illustrated in FIG. 11B are respectively RD1×SR2, LD1×SR2, UD1×SR2, and DD1×SR2. Here, SR2 is a size ratio between the face area FA6 in the original image 20 and the maximum inscribed rectangle ISmax of the composition target area 15A.

If the set extraction frame EA is included in the target image (step S350: YES), the CPU 410 extracts a rectangular image in the extraction frame EA from the target image (step S360). In other words, the CPU 410 generates image data indicating a rectangular image which is obtained by cropping the target image with the extraction frame EA as a reference. For example, in the example of FIG. 11B, a rectangular image corresponding to the extraction frame EA2 is extracted from the original image 20. If the rectangular image is extracted, the face surrounding area extraction process is finished.

If the set extraction frame EA is not included in the target image (step S350: NO), that is, the extraction frame EA cannot be set within the target image, the CPU 410 performs an amended image generation process (step S370). The amended image generation process is a process of generating an amended image with a size of the extraction frame EA to be set by using a partial image included in the target image. The partial image which is used is an image in an area smaller than the extraction frame EA to be set. In the example of FIG. 11A, a partial image in an area excluding the external areas OSU and OSD from the extraction frame EA1 is used.

Figure 12:
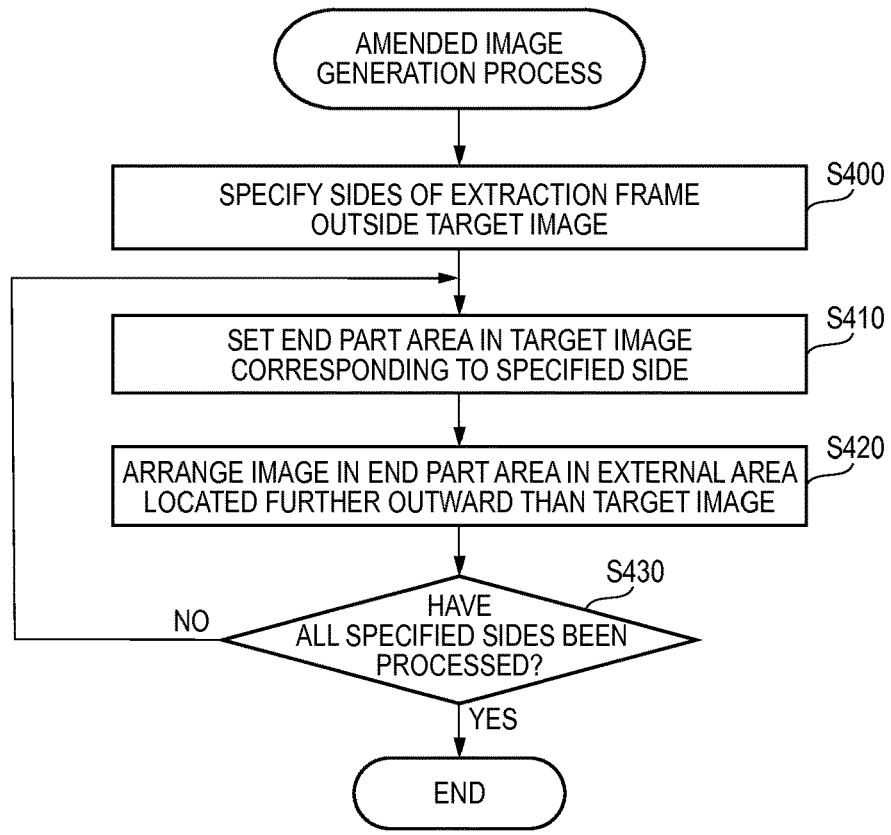
FIG. 12 is a flowchart illustrating an amended image generation process.
Figure 13:
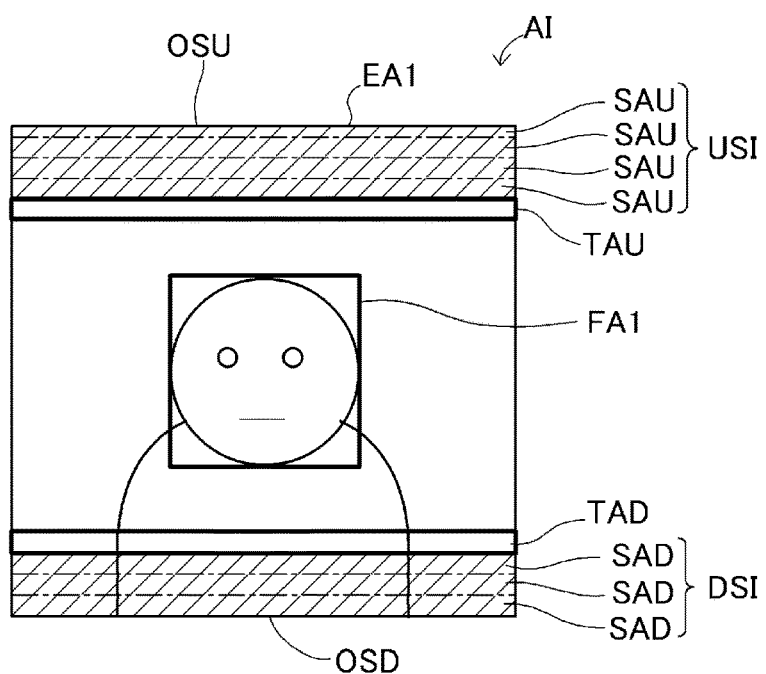
FIG. 13 is a diagram illustrating the amended image generation process.

FIG. 12 is a flowchart illustrating the amended image generation process. FIG. 13 is a diagram illustrating the amended image generation process. In step S400, the CPU 410 specifies sides (that is, end parts) of the extraction frame EA located outside the target image. In the example of FIG. 11A, an upper side and a lower side of the extraction frame EA1 are specified.

In step S410, the CPU 410 sets an end part area in the target image, corresponding to the specified one side. In the example of FIG. 11A, for example, in a case where the upper side of the extraction frame EA1 is a process target, an end part area TAU along the upper side of the original image 16 is set. A length UW1 in a direction along the upper side of the end part area TAU is set to be the same as a length of the upper side of the extraction frame EA1, and a length UH1 in a direction perpendicular to the upper side of the end part area TAU is set to a predetermined value (for example, a length corresponding to three pixels to ten pixels).

In step S420, the CPU 410 arranges an image in the end part area of the target image in the external area of the extraction frame EA. For example, in the example of FIG.

11A, the CPU 410 arranges an image SAU in the end part area TAU along the upper side of the original image 16 in the upper external area OSU of the extraction frame EA1. As a result, as illustrated in FIG. 13, a supplementary image USI which is obtained by arranging four images SAU in the end part area TAU in the vertical direction is generated in the upper external area OSU.

In step S430, the CPU 410 determines whether or not all the sides specified in step S400 have been processed. In the example of FIG. 11A, it is determined whether or not the upper side and the lower side of the extraction frame EA1 have been processed. If there is an unprocessed side (step S430: NO), the CPU 410 performs the processes in steps S410 and S420 on the unprocessed side. For example, in the example of FIG. 11A, the lower side of the extraction frame EA1 is set as a process target, and an end part area TAD along the lower side of the original image 16 is set (step S410). In addition, an image SAD in the end part area TAD is arranged in the lower external area OSD (step S420). As a result, as illustrated in FIG. 13, a supplementary image DSI obtained by arranging four images SAD in the end part area TAD in the vertical direction is generated in the lower external area OSD.

If all the sides specified in step S400 have been processed (step S430: YES), the amended image generation process is finished. The upper supplementary image USI contacting the upper end part area TAU and the lower supplementary image DSI contacting the lower end part area TAD are generated through the amended image generation process. As a result, an amended image AI (FIG. 13) having the same size as the size of the extraction frame EA1 to be set is generated. After the amended image generation process is finished, the face surrounding area extraction process is finished (FIG. 8).

As mentioned above, if the extraction frame EA is included in the target image (step S350: YES), a rectangular image in the set extraction frame EA is extracted from the target image (FIG. 11B), and if the extraction frame EA is not included in the target image (step S350: NO), an amended image corresponding to the set extraction frame EA is generated by using a partial image in the target image (FIGS. 11A and 13). Therefore, when an image in a rectangular image is composited in a composition target area in the subsequent process, an appropriate image can be composited. In other words, it is possible to perform the composition so that there is no portion in the composition target area where the image cannot be composited, and the face area FA is appropriately disposed in the composition target area.

Referring to FIG. 6 again, if there are a plurality of effective face areas in the target image (step S150: NO), the CPU 410 performs a maximum rectangle extraction process (step S160). For example, in a case where the original image 17 of FIG. 5B is a target image, the original image 17 includes two face areas FA2 and FA3, and thus the maximum rectangle extraction process is performed. If an operation mode is the entirety extraction mode (step S110: NO), or if it is determined that the target image is an image different from a portrait image including a person (step S140: NO), similarly, the maximum rectangle extraction process is performed (step S160). For example, in a case where the original image 18 of FIG. 5C is a target image, the original image 18 is an image different from a portrait image including a person, and thus the maximum rectangle extraction process is performed.

Figure 14:
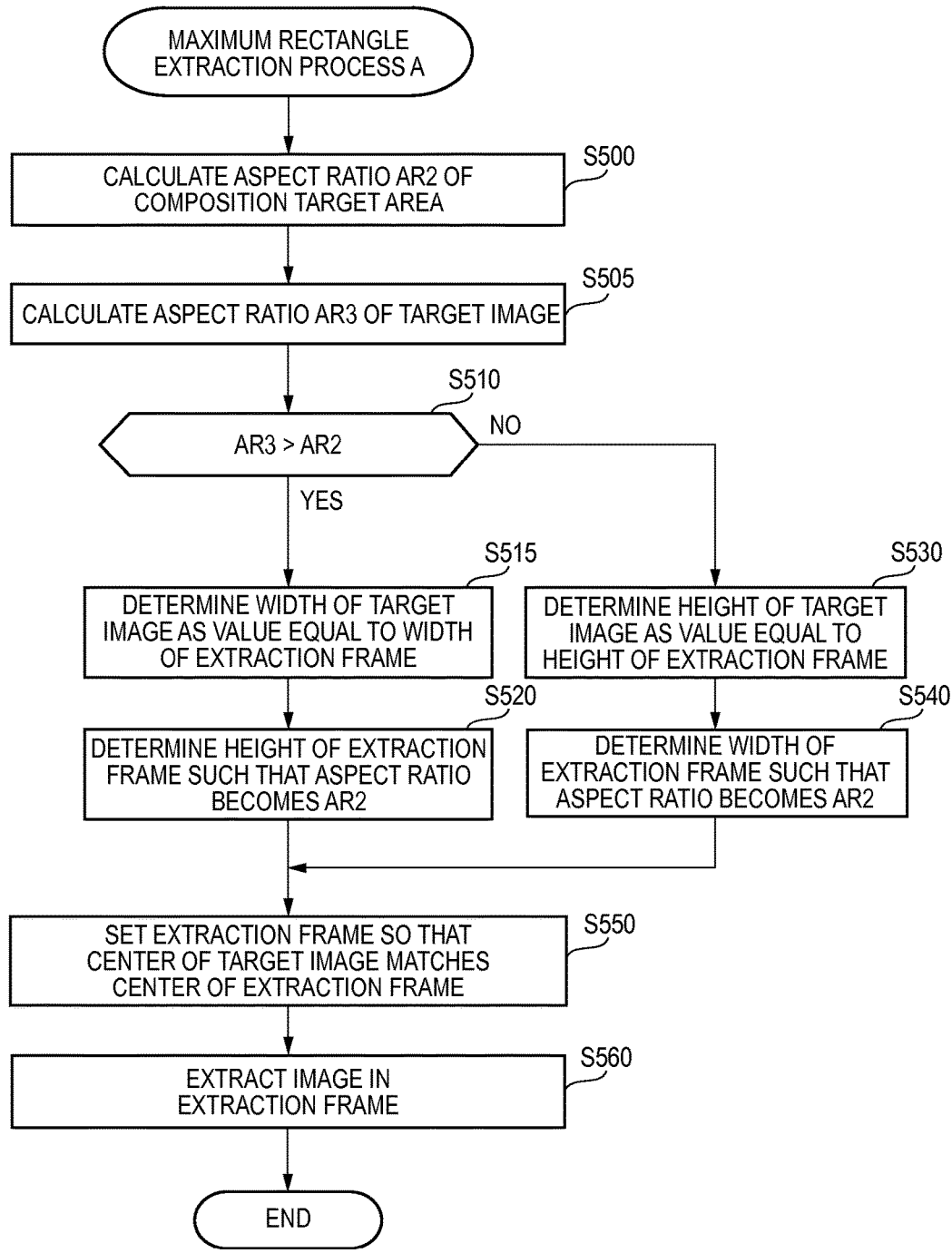
FIG. 14 is a flowchart illustrating a maximum rectangle extraction process.
Figure 15A:
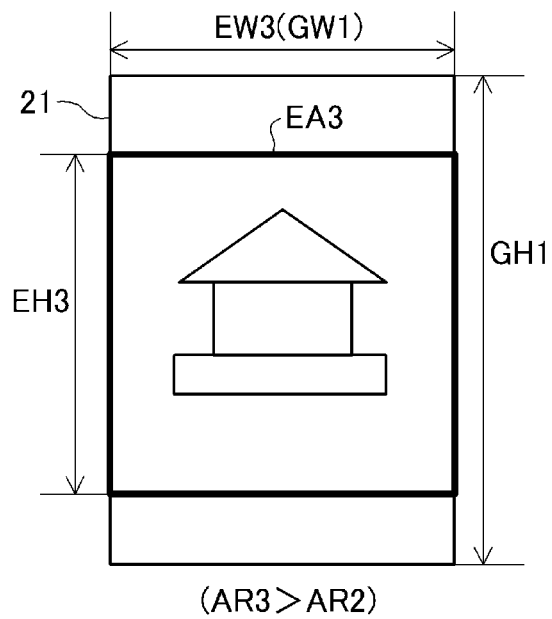
FIGS. 15A and 15B are diagrams illustrating the maximum rectangle extraction process.
Figure 15B:
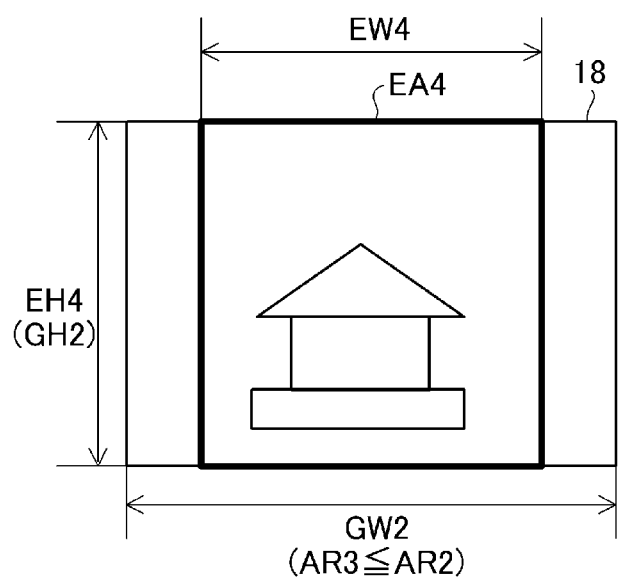

FIG. 14 is a flowchart illustrating the maximum rectangle extraction process. FIGS. 15A and 15B are diagrams illustrating the maximum rectangle extraction process. The maximum rectangle extraction process is a process of extracting a maximum rectangular image which has the aspect ratio AR2 of a composition target area and can be extracted from the target image, regardless of the presence of a face area FA.

In step S500, the CPU 410 calculates the aspect ratio AR2 of the composition target area. The aspect ratio AR2 of the composition target area is calculated by using, for example, the area information 12 (FIG. 2C). The composition target area may have a rectangular shape as in the composition target area 15B (FIG. 2A), but may have other exterior shapes different from the rectangular shape. For example, the composition target area 15A (FIGS. 9 and 2A) has an exterior shape including a plurality of sides which are relatively complicatedly disposed as in saw teeth, and the composition target area 15C (FIG. 2A) has an exterior shape including curves. For this reason, in the present embodiment, widths and heights of the circumscribed rectangles 14A to 14C which are respectively circumscribed to the composition target areas 15A to 15C are used as widths and heights of the composition target areas 15A to 15C (FIG. 2A). For example, the aspect ratio AR2 of the composition target area 15B is H2/W2 (FIG. 2A).

In step S505, the CPU 410 calculates an aspect ratio AR3 of the target image. For example, in a case where the target image is an original image 21 (FIG. 15A), the aspect ratio AR3 of the target image is GH1/GW1. In addition, in a case where the target image is the original image 18 (FIG. 15B), the aspect ratio AR3 of the target image is GH2/GW2. In step S510, the CPU 410 determines whether or not the aspect ratio AR3 of the target image is greater than the aspect ratio AR2 of the composition target area.

If the aspect ratio AR3 is greater than the aspect ratio AR2 (step S510: YES), the CPU 410 determines a width EW of the extraction frame EA to the same value as a width GW of the target image (step S515). In addition, after the width EW of the extraction frame EA is determined, a height EH of the extraction frame EA is determined so that an aspect ratio of the extraction frame EA is the same as the aspect ratio AR2 of the composition target area (step S520). If the aspect ratio AR3 is greater than the aspect ratio AR2, a shape of the target image is vertically longer than a shape of the extraction frame EA. Therefore, if the height EH of the extraction frame EA is determined earlier than the width EW, the extraction frame EA becomes larger than the target image. For this reason, in a case where the aspect ratio AR3 is greater than the aspect ratio AR2, the width EW of the extraction frame EA is determined earlier than the height EH in order to set the extraction frame EA within the target image.

In FIG. 15A, the aspect ratio AR3 of the original image 21 which is the target image is greater than an aspect ratio of an extraction frame EA3 to be set (that is, the aspect ratio AR2 of the composition target area to be composited). In other words, the original image 21 has a vertically longer shape than a shape of the extraction frame EA3 to be set. In this case, as described above, a width EW3 of the extraction frame EA3 is determined earlier (EW3=GW1, step S515). Then, a height EH3 of the extraction frame EA3 is determined so that the aspect ratio of the extraction frame EA3 is the same as the aspect ratio AR2 of the composition target area (step S520).

If the aspect ratio AR3 is equal to or less than the aspect ratio AR2 (step S510: NO), the CPU 410 determines the height EH of the extraction frame EA to a value which is the same as the height GH of the target image (step S530). In addition, after the height EH of the extraction frame EA is determined, the width EW of the extraction frame EA is determined so that the aspect ratio of the extraction frame EA is the same as the aspect ratio AR2 of the composition target area (step S540). If the aspect ratio AR3 is equal to or less than the aspect ratio AR2, a shape of the target image is horizontally longer than a shape of the extraction frame EA. Therefore, if the width EW of the extraction frame EA is determined earlier than the height EH, the extraction frame EA becomes larger than the target image. For this reason, in a case where the aspect ratio AR3 is equal to or less than the aspect ratio AR2, the height EH of the extraction frame EA is determined earlier than the width EW in order to set the extraction frame EA within the target image.

In FIG. 15B, the aspect ratio AR3 of the original image 18 which is the target image is equal to or less than an aspect ratio of an extraction frame EA4 to be set (that is, the aspect ratio AR2 of the composition target area to be composited). In other words, the original image 18 has a horizontally longer shape than a shape of the extraction frame EA4 to be set. In this case, as described above, a height EH4 of the extraction frame EA4 is determined earlier (EH4=GH2, step S530). Then, a width EW4 of the extraction frame EA4 is determined so that the aspect ratio of the extraction frame EA4 is the same as the aspect ratio AR2 of the composition target area (step S540).

A size of the extraction frame EA is determined due to the processes in steps S500 to S540. The determined size is a size of a rectangle which has the same aspect ratio as the aspect ratio AR2 of the composition target area and is a size of a maximum rectangle (hereinafter, also referred to as a maximum rectangular size) which can be included within the target image.

In step S550, the CPU 410 sets the extraction frame EA for the target image so that a center of the extraction frame EA whose size has been determined matches a center of the target image. In step S560, the CPU 410 extracts a rectangular image in the extraction frame EA from the target image. As a result, there is a generation of image data indicating a rectangular image which is obtained by cropping the target image with the extraction frame EA as a reference. If the rectangular image is extracted, the maximum rectangle extraction process is finished. As described above, the width EW of the extraction frame EA is determined to be a value which is the same as the width GW of the target image (step S515), or the height EH of the extraction frame EA is determined to be a value which is the same as the height GH of the target image (step S530). Therefore, the rectangular image is extracted so that at least two sides of upper and lower two sides and left and right two sides of the rectangular image match correspond to two sides of the target image.

It is possible to extract a rectangular image with a maximum rectangular size through the maximum rectangle extraction process. As a result, when a partial image in the rectangular image is composited in a composition target area in the subsequent process, an image with the maximum size which can be composited by using the target image can be composited in the composition target area.

If either one of the face surrounding area extraction process and the maximum rectangle extraction process is performed, in step S170 of FIG. 6, the CPU 410 determines whether or not all original image data items have been processed as target image data items. If there is unprocessed original image data (step S170: NO), the process is returned to step S100 where the unprocessed original image data is selected, and the above-described processes in steps S100 to S160 are repeatedly performed thereon. If all the original image data items have been processed (step S170: YES), the cropping process is finished.

Figure 16A:
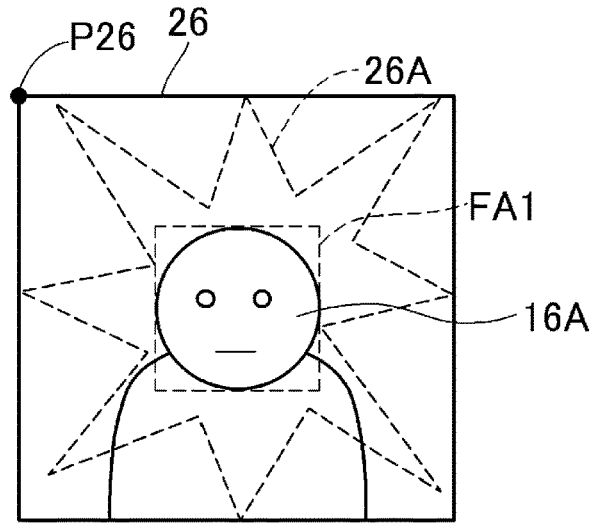
FIGS. 16A to 16C are diagrams illustrating examples of rectangular images generated by using original images.
Figure 16B:
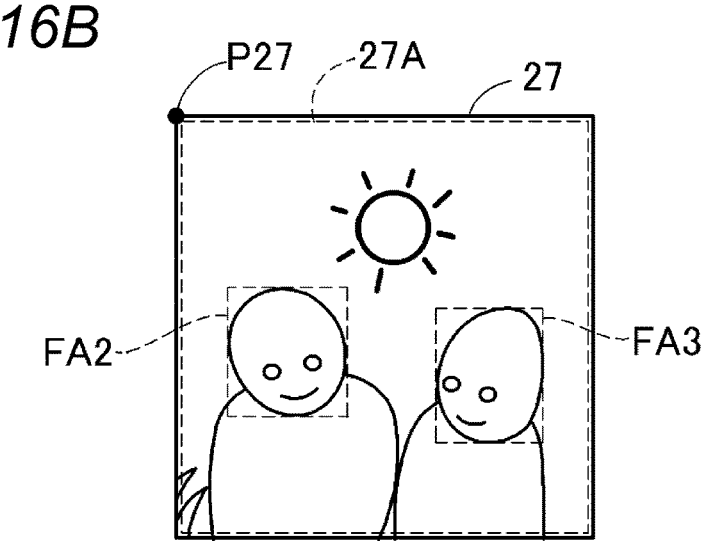
Figure 16C:
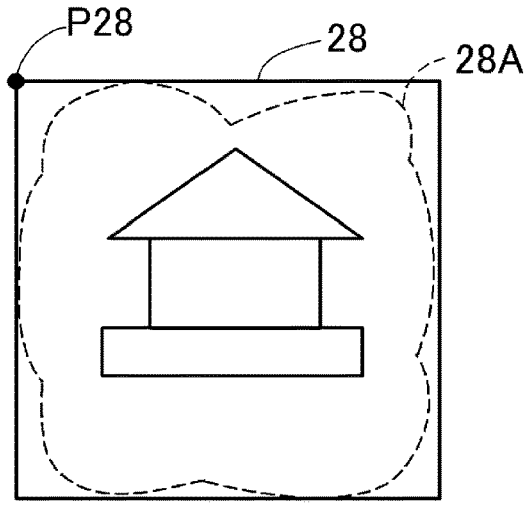
Figure 17A:
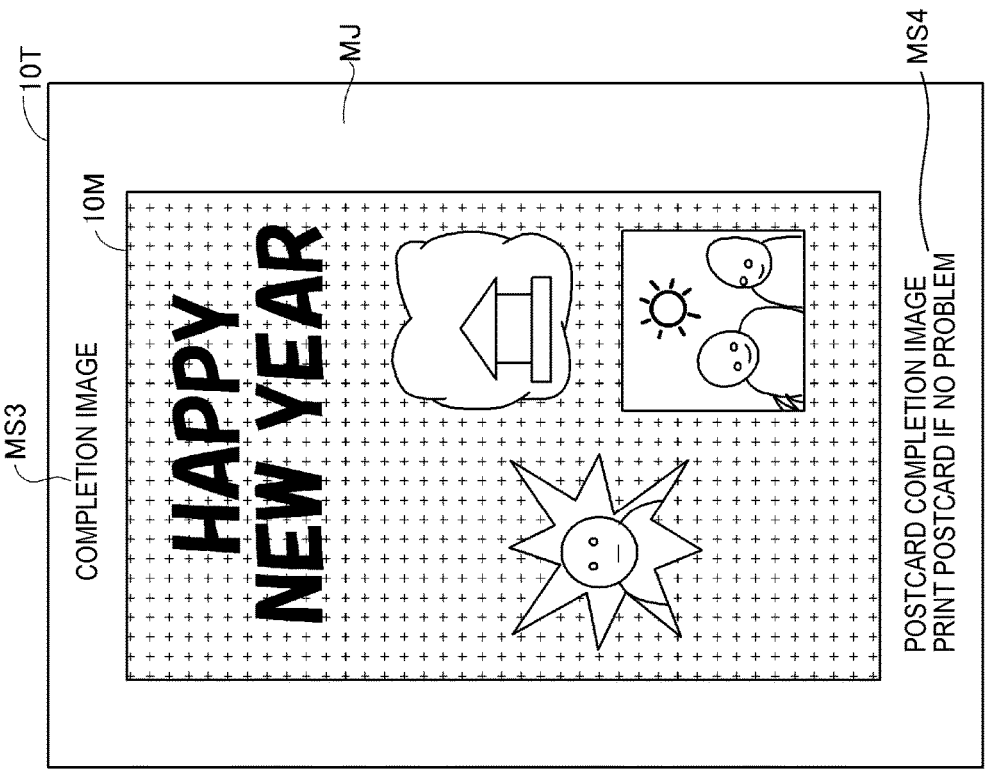
FIGS. 17A and 17B are diagrams illustrating an example of a composited image which is generated.
Figure 17B:
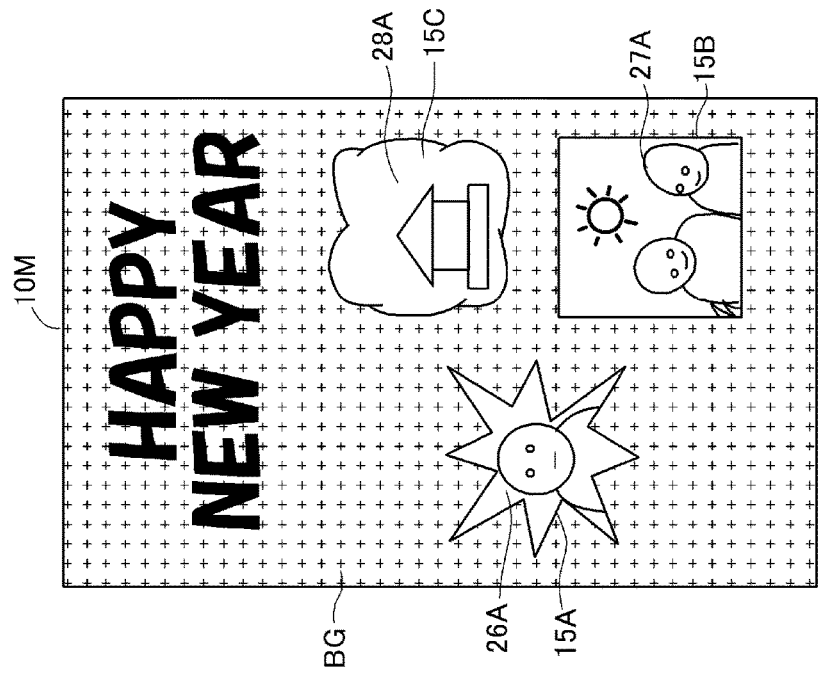

FIGS. 16A to 16C are diagrams illustrating examples of rectangular images generated by using original images. FIGS. 17A and 17B are diagrams illustrating an example of a composited image. FIGS. 16A to 16C respectively illustrate rectangular images 26 to 28 generated by using the original images 16 to 18 of FIGS. 5A to 5C. For example, the rectangular image 26 of FIG. 16A is an amended image AI (FIG. 13) generated through the face surrounding area extraction process (FIG. 8). The rectangular images 27 and 28 of FIGS. 16B and 16C are images extracted through the maximum rectangle extraction process (FIG. 14). Through processes described in the following, the three rectangular images 26 to 28 of FIGS. 16A to 16C and the template image 10 illustrated in FIG. 2A are composited with each other, so that a composited image 10M of FIGS. 17A and 17B is generated.

In step S50 of FIG. 3, the CPU 410 performs a size adjusting process. The size adjusting process is a process of adjusting a size of a rectangular image extracted due to the cropping process in accordance with a size of a corresponding composition target area. A composition target area corresponding to a rectangular image is a composition target area with which a partial image inscribed in a contour of the rectangular image is to be composited. In the examples of FIGS. 16A to 17B, the rectangular images 26 to 28 respectively correspond to the composition target areas 15A to 15C of the template image 10 (FIG. 2A).

Specifically, the CPU 410 calculates a size ratio between a horizontal size of a rectangular image and a horizontal size of a circumscribed rectangle of a corresponding composition target area. The CPU 410 enlarges or reduces the rectangular image without changing an aspect ratio of the rectangular image by using the calculated size ratio. Since the aspect ratio of the rectangular image has been extracted so as to match an aspect ratio of the composition target area, as a result of the enlargement or the reduction, a vertical size and a horizontal size of the rectangular image match a vertical size and a horizontal size of the circumscribed rectangle of the corresponding composition target area. For example, sizes of the rectangular images 26 to 28 (FIGS. 16A to 16C) whose sizes have been adjusted respectively match sizes of the circumscribed rectangles 14A to 14C (FIG. 2A) of the composition target areas 15A to 15C.

In step S55, the CPU 410 performs a composition process of compositing a partial image in the rectangular image with a corresponding composition target area by using the rectangular image whose size has been adjusted. Specifically, the CPU 410 acquires a position (coordinate) of an upper left vertex of the composition target area on the template image 10 by referring to the area information 12 (FIG. 2C). The CPU 410 correlates a coordinate system of the template image 10 with a coordinate system of the rectangular image so that a pixel of the upper left vertex of the circumscribed rectangle of the composition target area corresponds to a pixel of the upper left vertex of the rectangular image. For example, pixels of vertices P26 to P28 (FIGS. 16A to 16C) of the rectangular images 26 to 28 are respectively correlated with pixels (FIG. 2A) of the vertices P1 to P3 of the circumscribed rectangles 14A to 14C of the composition target areas 15A to 15C.

Description will be made of a state in which a coordinate system of the template image 10 is correlated with a coordinate system of the rectangular image, that is, the composition target area and the rectangular image are superimposed on each other so that the upper left vertex of the composition target area of the template image 10 matches the upper left vertex of the rectangular image. In this state, in the rectangular image 26 extracted due to the face surrounding area extraction process, it can be seen from FIGS. 9 and 16A that an outer edge (FIG. 16A) of the face area FA1 in the rectangular image 26 matches the maximum inscribed rectangle ISmax (FIG. 9) in the composition target area 15A. In other words, the face 16A in the face area FA1 contacts with the maximum inscribed rectangle ISmax. In addition, an outer edge (FIG. 16A) of the rectangular image 26 matches the outline of the circumscribed rectangle 14A of the composition target area 15A.

In addition, the CPU 410 sets pixels in the rectangular image one by one as a target pixel, and performs the following process on each pixel in the rectangular image. In other words, the CPU 410 refers to a pixel in the mask image 11 (FIG. 2B), corresponding to the target pixel in the rectangular image. If a value of the pixel in the mask image 11 which is referred to is the second value, the CPU 410 replaces a color value of a pixel in the template image 10, corresponding to the pixel in the mask image 11 which is referred to, with a color value of the target pixel in the rectangular image. If a value of the pixel in the mask image 11 which is referred to is the first value, the CPU 410 maintains the color value of the pixel in the template image 10, corresponding to the pixel in the mask image 11 which is referred to, in an original value.

As a result, color values of a plurality of pixels forming the composition target areas 15A to 15C of the template image 10 are respectively replaced with color values of pixels in the corresponding rectangular images 26 to 28. In other words, partial images 26A to 28A (FIGS. 16A to 16C) to be composited are specified from the corresponding rectangular images 26 to 28, and the specified partial images 26A to 28A are composited in the composition target areas 15A to 15C (FIG. 2A) of the template image 10. Therefore, composited image data indicating the composited image 10M (FIG. 17A) is generated.

As illustrated in FIGS. 16A to 16C, the partial images 26A to 28A specified in the rectangular images 26 to 28 are images which are inscribed in the contours of the rectangular images 26 to 28 and have the same shapes and sizes as those of the composition target areas 15A to 15C.

In step S60, the CPU 410 generates test image data indicating a test image 10T (FIG. 15B) by using the composited image data generated in step S55. The test image 10T includes the composited image 10M and a blank space MJ. Messages MS3 and MS4 indicating that the test image 10T is an image for test printing of the composited image 10M are disposed in the blank space MJ.

In addition, the composited image data indicating the composited image 10M is image data for printing the composited image 10M on a postcard. On the other hand, the test image data indicating the test image 10T is data for printing the test image 10T on a sheet with an A4 size which is larger than that of a postcard. A size of the composited image 10M on the postcard, which is printed on the postcard by using the composited image data, is the same as a size of the composited image 10M in the test image 10T on the sheet, which is printed on the sheet with the A4 size by using the test image data. For this reason, the user who views the test image 10T printed on the sheet with the A4 size can appropriately confirm content of the composited image 10M in a case of being printed on a postcard, without printing the composited image 10M on the postcard.

As mentioned above, the composited image 10M included in the test image 10T indicated by the test image data has the same size as that of the composited image 10M indicated by the composited image data. For this reason, the test image data can be easily generated by simply adding image data corresponding to the blank space to the composited image data. In other words, it is not necessary to generate a new composited image for the test image data.

In step S65, the CPU 410 transmits the generated composited image data and test image data to the multifunctional peripheral 200, and finishes the process. When the composited image data and the test image data are received, the CPU 210 of the multifunctional peripheral 200 stores the data in the nonvolatile storage device 230, and notifies the user that the composited image data and the test image data have been received. In addition, the CPU 210 may store the composited image data and the test image data on a removable medium such as a USB memory or a media card connected to the multifunctional peripheral 200.

The composited image data and the test image data are provided for the user's use. The user causes, for example, the multifunctional peripheral 200 to print the test image 10T on a sheet with the A4 size. In addition, the user confirms the composited image 10M included in the test image 10T printed on the sheet with the A4 size. If the user is satisfied with the content of the composited image 10M, the user causes the multifunctional peripheral 200 to print the composited image 10M on a postcard. If the user is not satisfied with the content of the composited image 10M, the user may generate the composited image 10M once more. For example, the user may change a template image or an original image to be used, so as to cause the multifunctional peripheral 200 and the server 400 to perform the process of FIG. 3 once more.

According to the cropping process (FIG. 6) of the embodiment, for example, in a case where the original image 16 (FIG. 5A) is a target image, the CPU 410 performs the face area detection process (step S120 of FIG. 6) in order to specify the face 16A of a person which is an object in the original image 16. In addition, in the subsequently performed face surrounding area extraction process (step S155 of FIG. 6, and FIG. 8), the CPU 410 specifies the maximum inscribed rectangle ISmax which is inscribed in the composition target area 15A (FIGS. 2A and 9) and the circumscribed rectangle 14A (steps S310 and S320 of FIG. 8). Further, the CPU 410 calculates the size ratio SR1 of the maximum inscribed rectangle ISmax and the face area FA1 (step S330 of FIG. 8), and sets the extraction frame EA1 including the face area FA1 in the target image (step S340 of FIG. 8). As described above, the extraction frame EA1 is set so that the face 16A in the rectangular image 26 contacts with the inscribed rectangle IS of the composition target area 15A, and the outer edge (FIG. 16A) of the rectangular image 26 matches the outline of the circumscribed rectangle 14A (FIGS. 2A and 9) of the composition target area 15A when the rectangular image 26 (FIG. 16A) generated so as to correspond to the extraction frame EA1 is superimposed on the composition target area 15A. As a result, an image whose size has been appropriately adjusted based on the size ratio SR1 can be composited in the template image 10. Further, a face can be composited at an appropriate position regardless of a shape of the composition target area 15A, and an image can be appropriately composited in the entire composition target area 15A. In other words, in the composited image 10M, the face 16A in the original image 16 can be included in the maximum inscribed rectangle ISmax of the composition target area 15A, and it is possible to prevent the occurrence of an area where an image cannot be composited around the outer edge of the composition target area 15A. As a result, it is possible to appropriately composite an image including a face in the composition target area 15A.

As can be seen from the above description, the areas defined by the extraction frames EA1 and EA2 illustrated in FIGS. 11A and 11B are examples of a first area, and the composition target area 15A (FIGS. 2A and 9) is an example of a composition target area which has a shape different from an inscribed figure and a circumscribed figure.

In addition, in the face surrounding area extraction process (step S155 of FIG. 6, and FIG. 8), in a case where the above-described extraction frame EA1 cannot be set within the target image, that is, the extraction frame EA1 includes the external areas OSD and OSU located further outward than the target image (step S350 of FIG. 8: NO), the CPU 410 performs the amended image generation process (step S370). In addition, the CPU 410 composites the amended image AI (FIG. 13) generated through the generation process in the composition target area 15A (step S55). As a result, even in a case where the extraction frame EA1 cannot be set within the target image, an image including the face area FA1 can be appropriately composited in a composition target area.

Further, in the amended image generation process, the CPU 410 generates the supplementary images USI and DSI which are respectively in contact with the end part areas TAU and TAD by using pixel values in the end part areas TAU and TAD along the sides of the partial images included in the extraction frame EA1 of the target image (FIG. 13). Therefore, it is possible to reduce an uncomfortable feeling which the generated amended image AI may have.

In addition, in a case where a plurality of face areas FA are present in the target image (step S150 of FIG. 6: NO), or the target image is an image different from a portrait image including a person (step S140 of FIG. 6: NO), the maximum rectangle extraction process different from the face surrounding area extraction process (step S160 of FIG. 6) is performed. As a result, even in a case where a plurality of face areas FA are present in the target image, or the target image is an image different from a portrait image including a person, it is possible to composite an image with an appropriate size extracted from the target image in a composition target area.

B. Second Illustrative Embodiment

Figures 19, 20:
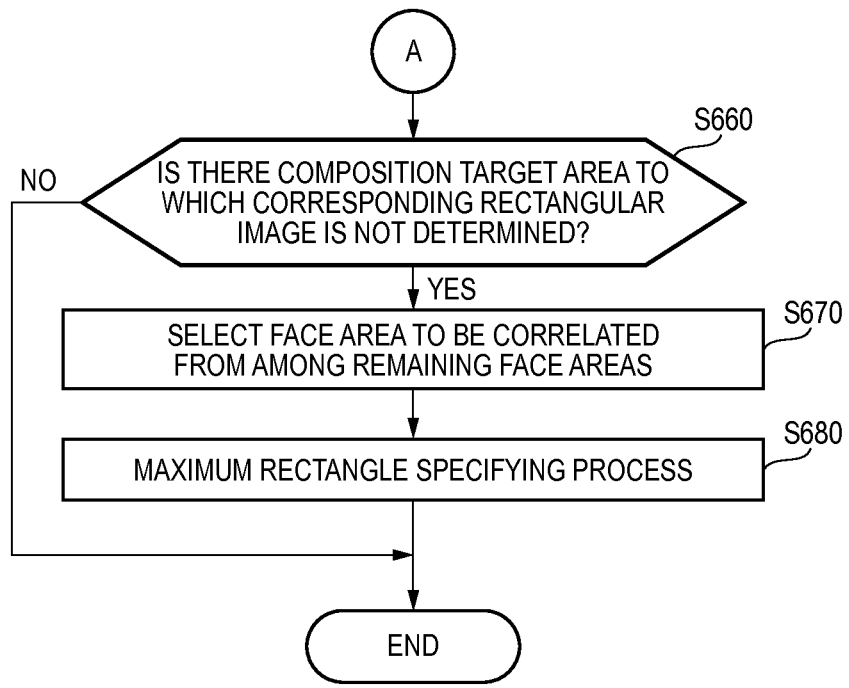
FIG. 19 is a flowchart illustrating the cropping process of the second illustrative embodiment.
FIG. 20 is a diagram illustrating an example of a record table.

In a second illustrative embodiment, a cropping process different from the cropping process (FIG. 6) of the first illustrative embodiment is performed. FIGS. 18 and 19 are flowcharts illustrating a cropping process of the second illustrative embodiment.

In step S600, the CPU 410 selects a composition target area which is a process target. For example, one composition target area is selected as a process target from among a plurality of composition target areas 15A to 15C of the template image 10 (FIG. 2A) selected by a user. The composition target area is selected, for example, according to a priority order of a composition target area which is predefined for each template image 10.

In step S605, the CPU 410 selects one original image data item as target image data from among original image data items which are acquired from the multifunctional peripheral 200. For example, in the present embodiment, it is assumed that a plurality of original image data items indicating original images including a face area, for example, the original images 16, 17, and 19 of FIGS. 5A, 5B, and 5D or the original image 20 of FIG. 11B are acquired from the multifunctional peripheral 200. The original image data is selected according to a predetermined priority order. For example, a priority order of original image data may be determined by, for example, the user, and the server 400 may be notified of the determined priority order.

In step S610, the CPU 410 performs a face area detection process of detecting a face area FA in a target image. The face area detection process of the second illustrative embodiment is the same as the face area detection process (step S120 of FIG. 6) of the first illustrative embodiment. As a result, for example, in a case where the target image is the original image 16 of FIG. 5A, the face area FA1 is detected, and in a case where the target image is the original images 17 and 19 of FIGS. 5B and 5D, the face areas FA2 to FA5 are detected.

In step S615, the CPU 410 selects a face area FA which is a process target from among the face areas detected from the target image. The face area FA which is a process target is selected according to a predetermined priority order. For example, a priority order of the face area FA may be determined in a higher order as an area is greater, and may be determined in a higher order as an area is closer to a center of the target image.

In step S620, the processes in steps S300 to S340 of the face surrounding area extraction process of FIG. 8 are performed. As a result, as described in the first illustrative embodiment, the extraction frame EA is set to the target image. For example, as illustrated in FIG. 11A, in a case where the target image is the original image 16, the extraction frame EA1 including the external areas OSD and OSU located further outward than the original image 16 is set. As illustrated in FIG. 11B, in a case where the target image is the original image 20, the extraction frame EA2 included in the original image 20 is set.

In step S625, in the same manner as in step S350 of FIG. 8, the CPU 410 determines whether or not the set extraction frame EA is included in the target image.

If the set extraction frame EA is included in the target image (step S625: YES), the CPU 410 extracts a rectangular image in the extraction frame EA from the target image in the same manner as in step S360 of FIG. 8 (step S630). For example, in the example of FIG. 11B, a rectangular image corresponding to the extraction frame EA2 is extracted from the original image 20.

If the rectangular image is extracted, in step S635, the CPU 410 records a result of the process in step S630 in a predetermined record table. FIG. 20 is a diagram illustrating an example of a record table 40. The record table 40 is provided in, for example, the buffer area 421 (FIG. 1) of the volatile storage device 420. The record table 40 is a table which records a rectangular image composited in a corresponding composition target area for each composition target area. For example, in a case where the original image 17 (FIG. 5B) including a plurality of face areas FA2 and FA3 is the target image, a rectangular image extracted from the original image 17 in step S630 may include two types such as a rectangular image which is extracted with the face area FA2 as a reference and a rectangular image which is extracted with the face area FA3 as a reference. In order to appropriately differentiate the two types of rectangular images from each other, the rectangular images are differentiated by a composition of information for specifying an original image which is an extraction source and information for specifying a face area FA which is used as a reference during extraction. In other words, it can be said that one composition target area is correlated with one face area FA among a plurality of face areas FA included in a plurality of original images.

It is recorded in the record table 40 of FIG. 20 that a rectangular image composited in the composition target area 15A is a rectangular image which is extracted from the original image 20 with the face area FA6 as a reference. In addition, it is recorded that a rectangular image composited in the composition target area 15B is a rectangular image which is extracted from the original image 17 with the face area FA2 as a reference. Further, it is recorded that a rectangular image composited in the composition target area 15C is not determined (not extracted). If recording is performed on the record table 40, the CPU 410 makes the process proceed to step S650.

If the set extraction frame EA is not included in the target image (step S625: NO), that is, the extraction frame EA includes parts located further outward than the target image, the CPU 410 makes the process proceed to step S640 without extracting a rectangular image.

In step S640, the CPU 410 determines whether or not all the face areas FA detected in the target image have been processed as a process target. If there is an unprocessed face area FA (step S640: NO), the process is returned to step S615, and the unprocessed face area FA is selected as a process target. If all the detected face areas FA have been processed (step S640: YES), the CPU 410 determines whether or not all the original image data items have been processed as a process target (step S645). If there is an unprocessed original image data item (step S645: NO), the process is returned to step S605, and the unprocessed original image data item is selected as a processing target. If all the original image data items have been processed (step S645: YES), the CPU 410 determines whether or not all the composition target areas have been processed as a process target (step S650).

If there is an unprocessed composition target area (step S650: NO), the process is returned to step S600, and the unprocessed composition target area is selected as a process target. If all the composition target areas have been processed (step S650: YES), the CPU 410 determines whether or not there is a composition target area (also referred to as an undetermined composition target area) to which a corresponding rectangular image is not determined (step S660).

If there is an undetermined composition target area (step S660: YES), the CPU 410 selects a face area FA which is to be correlated with the undetermined composition target area, from among remaining face areas FA which are not correlated with other composition target areas (step S670). In a case where there are a plurality of undetermined composition target areas, a single face area to be correlated with each undetermined composition target area is selected. For example, a face area FA correlated with an undetermined composition target area is selected based on a priority order so that a face area FA having a higher priority order described above is correlated with a composition target area having a higher priority order.

In step S680, the CPU 410 performs the maximum rectangle extraction process (FIG. 14) described in the first illustrative embodiment, with an original image including a face area FA correlated with an undetermined composition target area as a process target. As a result, a rectangular image corresponding to the undetermined composition target area is extracted.

If there is no undetermined composition target area (step S660: NO), or the rectangular image corresponding to the undetermined composition target area is extracted in step S680, the CPU 410 finishes the cropping process. The extracted rectangular image is composited in a corresponding composition target area through the size adjusting process (step S50 of FIG. 3) and the compositing process (step S55 of FIG. 3) in the same manner as in the first illustrative embodiment.

According to the cropping process of the second illustrative embodiment described above, whether or not a face area FA is correlated with a composition target area is determined in the following method. That is, an extraction frame EA is set for a target image in the same method as in the face surrounding area extraction process of the first illustrative embodiment (step S620 of FIG. 18). Then, whether or not the face area FA is correlated with the composition target area is determined depending on whether or not the extraction frame EA can be set within the target image with the face area FA as a reference (step S625). Further, if the face area FA which is a process target is not a face area to be correlated with a single composition target area (step S625: NO), the process is repeatedly performed with another face area FA in the target image as a process target (step S640: NO).

In other words, in a case where a first face area and a second face area are included in the target image, an extraction frame EA including the first face area cannot be set within the target image, and an extraction frame EA including the second face area can be set within the target image, the CPU 410 correlates the second face area with a composition target area. As a result, in the subsequently performed compositing process, an image including the second face area is composited in a corresponding composition target area in a composited image. Therefore, even in a case where the extraction frame EA including the first face area cannot be set, it is possible to generate an appropriate composited image by using the image including the second face area.

In addition, in the present embodiment, if there is no face area to be correlated with the composition target area in the target image (step S640: YES), the process is repeatedly performed with a face area FA in another target image as a process target (step S645: NO).

In other words, in a case where original image data indicating a first original image and original image data indicating a second original image are acquired, an extraction frame EA including a face area in the first original image cannot be set within the first original image, and an extraction frame EA including a face area in the second original image can be set within the second original image, the CPU 410 correlates the face area in the second original image with a composition target area. As a result, in the subsequently performed compositing process, an image including the face area in the second original image is composited in a corresponding composition target area in a composited image. Therefore, even in a case where the extraction frame EA including the face area in the first original image cannot be set, it is possible to generate an appropriate composited image by using the second original image.

Further, in the present embodiment, in the method based on whether or not an extraction frame EA can be set, in a case where, among all face areas FA in all target images, any face area FA is not correlated with a specific composition target area, the CPU 410 correlates a face area FA which is not correlated with other composition target areas with the specific composition target area. In this case, the CPU 410 extracts a rectangular image which is used to composite an image in the specific composition target area by using the maximum rectangle extraction process of the first illustrative embodiment (steps S670 and S680). As a result, in the method based on whether or not an extraction frame EA can be set, even in a case where a face area FA cannot be correlated with the specific composition target area, it is possible to generate an appropriate composited image by using an image including a face area FA which is not correlated with other composition target areas.

C. Third Illustrative Embodiment

Figure 21:
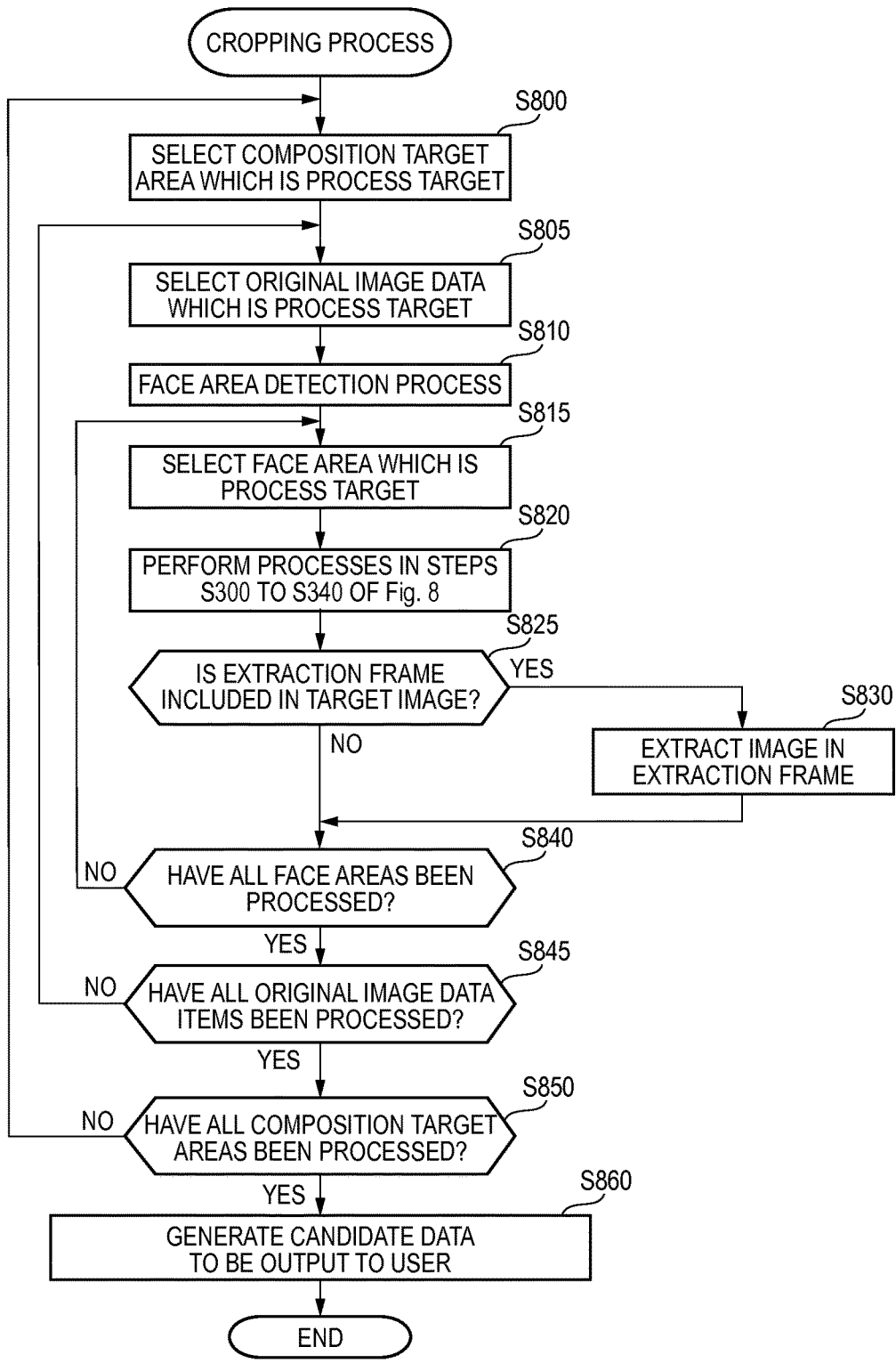
FIG. 21 is a flowchart illustrating a cropping process of a third illustrative embodiment.

In a third illustrative embodiment, a cropping process different from the cropping process (FIG. 6) of the first illustrative embodiment is performed. FIG. 21 is a flowchart illustrating a cropping process of the third illustrative embodiment.

Processes in steps S800 to S820 of FIG. 21 are the same as the processes in steps S600 to S620 of FIG. 18. In step S825, the CPU 410 determines whether or not the set extraction frame EA is included in the target image in the same manner as in step S350 of FIG. 8.

If the set extraction frame EA is included in the target image (step S825: YES), the CPU 410 extracts a rectangular image in the extraction frame EA from the target image in the same manner as in step S360 of FIG. 8 (step S830). If the set extraction frame EA is not included in the target image (step S825: NO), the CPU 410 skips the process in step S830.

In step S840, the CPU 410 determines whether or not all the face areas FA detected in the target image have been processed as a process target. If there is an unprocessed face area FA (step S840: NO), the process is returned to step S815, and the unprocessed face area FA is selected as a process target. If all the detected face areas FA have been processed (step S840: YES), the CPU 410 determines whether or not all the original image data items have been processed as a process target (step S845). If there is an unprocessed original image data item (step S845: NO), the process is returned to step S805, and the unprocessed original image data item is selected as a processing target. If all the original image data items have been processed (step S845: YES), the CPU 410 determines whether or not all the composition target areas have been processed as a process target (step S850).

If there is an unprocessed composition target area (step S850: NO), the process is returned to step S800, and the unprocessed composition target area is selected as a process target. If all the composition target areas have been processed (step S850: YES), the process proceeds to step S850. At this time, whether or not all face areas FA in all target images can be appropriately composited in composition target areas is determined for each composition target area.

In step S860, the CPU 410 generates candidate presenting data for presenting the rectangular image group extracted in step S830 to the user. Since each rectangular image includes a face area FA, the candidate presenting data can be said to be data for presenting face area candidates which can be appropriately composited in a composition target area, for each composition target area, to the user. The candidate image data includes, for example, for each composition target area, a plurality of thumbnail images including a face area FA which are determined as being capable of being composited, information for specifying an original image including the face area FA, and UI data for a face area selection process described later. As the information for specifying an original image which is an extraction source of the face area FA, a file name or the like of original image data indicating the original image which is an extraction source is used. If the candidate presenting data is generated, the cropping process of the third illustrative embodiment is finished.

Figure 22:
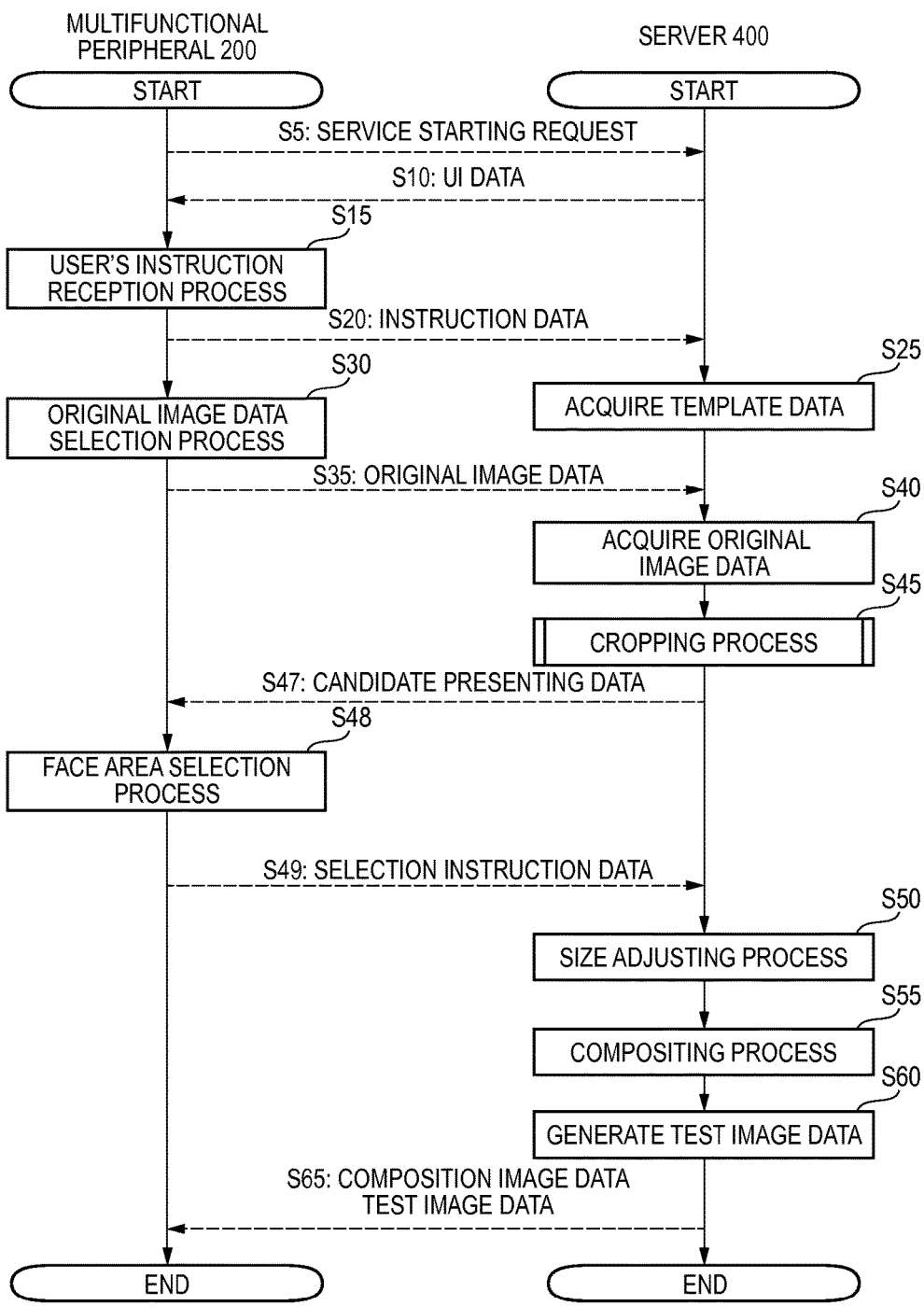
FIG. 22 is a flowchart illustrating an operation of an image processing system of the third illustrative embodiment.

FIG. 22 is a flowchart illustrating an operation of an image processing system of the third illustrative embodiment. A difference between the flowchart of FIG. 22 and the flowchart of FIG. 3 is that steps S47 to S49 are added after the cropping process of step S45.

In step S47, the CPU 410 transmits the candidate presenting data generated through the cropping process to the multifunctional peripheral 200. In step S48, the CPU 210 of the multifunctional peripheral 200 performs a face area selection process by using the received candidate presenting data. The face area selection process is a process of receiving an instruction for designating a face area to be composited in each composition target area in the template image used, from the user. For example, the CPU 410 receives selection of a face area FA to be composited in each of the three composition target areas 15A to 15C (FIG. 2A) of the template image 10, from the user.

Figure 23:
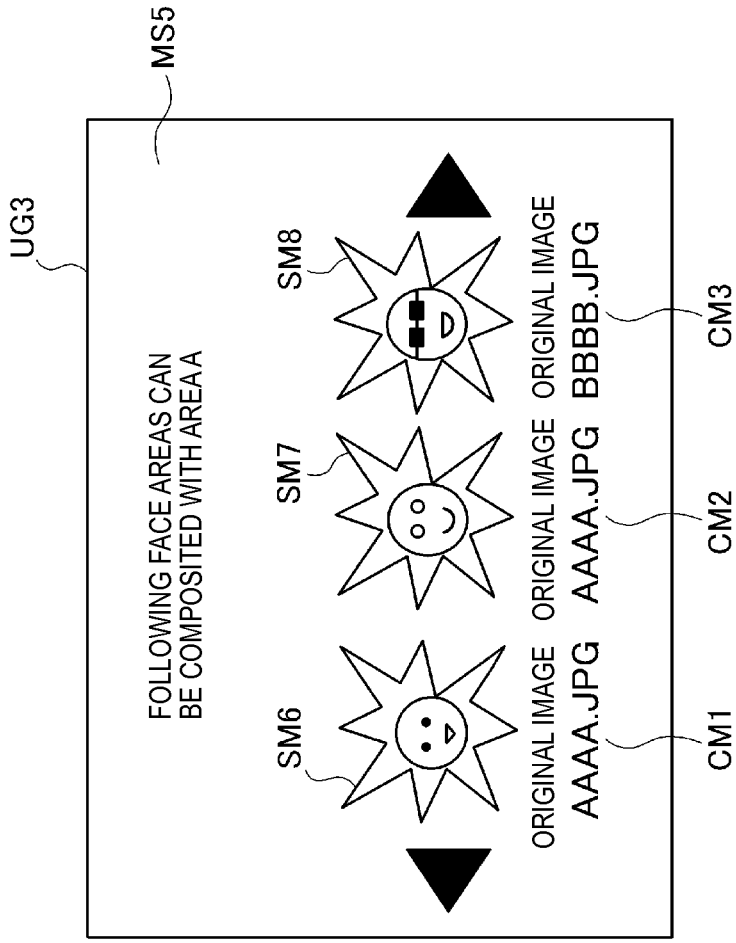
FIG. 23 is a diagram illustrating an example of a UI image.

FIG. 23 is a diagram illustrating an example of a UI image. A UI image UG3 is a UI image for receiving selection of a face area FA to be composited in the composition target area 15A of the template image 10. For example, the UI image UG3 includes a plurality of thumbnail images SM6 to SM8 indicating candidates of face areas FA which can be composited in the composition target area 15A. In addition, the UI image UG3 includes file names CM1 to CM3 of original image data items indicating original images including the face areas FA represented by the respective thumbnail images, and a message MS5 for prompting the user to select the face areas FA.

In step S49, the CPU 210 transmits selection instruction data indicating a selection instruction received from the user, to the server 400. The selection instruction data includes information for designating a face area FA which is selected for each composition target area by the user, and information indicating a composition target area with which the designated face area FA is to be composited.

In step S50, the CPU 410 adjusts a size of a rectangular image including the face area FA designated by the user in accordance with a size of a composition target area to be composited based on the received selection instruction data. In step S55, the CPU 410 generates composited image data indicating a composited image by using the rectangular image whose size has been adjusted. Specific process content of steps S50 and S55 is the same as in the first illustrative embodiment.

According to the above-described third illustrative embodiment, the CPU 410 determines whether or not a face area FA can be composited in a composition target area in the following method. That is, an extraction frame EA is set to a target image in the same method as in the face surrounding area extraction process of the first illustrative embodiment (step S820 of FIG. 21). Then, whether or not the face area FA can be composited in the composition target area is determined depending on whether or not an extraction frame EA can be set within the target image with the face area FA as a reference (step S825 of FIG. 21). Further, the CPU 410 extracts all candidates of face areas FA which are determined as being capable of being composited in a composition target area for each composition target area, from all face areas FA in all target images (that is, original images) (step S830). Furthermore, the CPU 410 presents the candidates of the face areas FA extracted for each composition target area to the user (step S850, and step S47 of FIG. 23).

In addition, the plurality of presented candidates of the face areas FA may include a plurality of face areas FA which are respectively included in a plurality of target images (original images). In other words, the CPU 410 may present candidates of face areas FA in one or more original images within which an extraction frame EA can be set, among a plurality of original images, to the user. As a result, it is possible to allow the user to recognize image data appropriate for generating a composited image among a plurality of original image data items.

The plurality of presented candidates of face areas FA may include a plurality of face areas FA included in a single target image (original image). In other words, the CPU 410 may present images of one or more extraction frames EA which can be set within an original image, among a plurality of extraction frames EA each of which including one of the plurality of face areas FA in the single original image, to the user. As a result, it is possible to allow the user to recognize a face area which is appropriate for being composited in a composition target area among the plurality of face areas FA in the single original image.

D. Modification Examples (1) In the amended image generation process of the first illustrative embodiment, the amended image AI is generated by arranging images in the end part areas TAD and TAU of the target image in the external areas OSD and OSU (FIGS. 12 and 13). Alternatively, an amended image may be generated by enlarging the end part area of the target image in one direction.

Figure 24A:
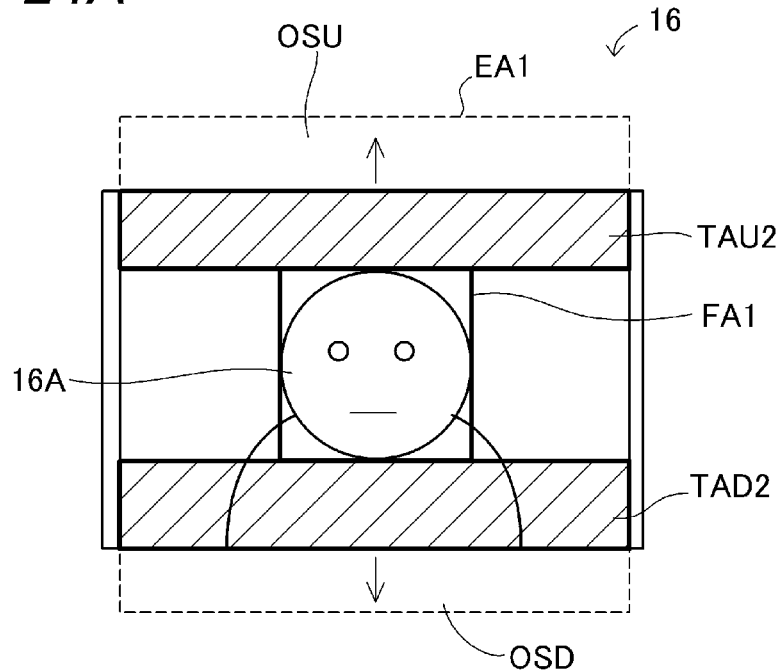
FIGS. 24A and 24B are diagrams illustrating an amended image generation process in a modification example.
Figure 24B:
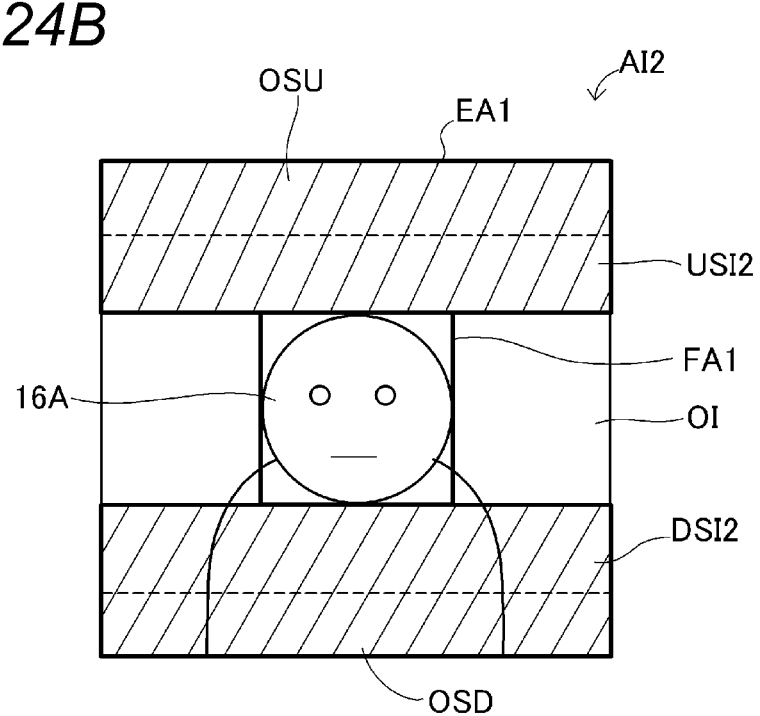

FIGS. 24A and 24B are diagrams illustrating an amended image generation process according to modification example. In a case where the external areas OSU and OSD are present on upper and lower sides of the original image 16, the CPU 410 sets end part areas TAU2 and TAD2 along the upper side of the original image 16 in the same manner as in the first illustrative embodiment. In an example of FIG. 24A, the end part area TAU2 is set as an area between the upper side of the face area FA1 and the upper side of the original image 16. The end part area TAD2 is set as an area between the lower side of the face area FA1 and the lower side of the original image 16. The present invention is not limited thereto, and it is only necessary that the end part area TAU2 does not include the face area FA1. For example, the end part area TAU2 may be a partial area along the upper side of the original image 16 in the area between the upper side of the face area FA1 and the upper side of the original image 16. This is also the same for the end part area TAD2.

The CPU 410 enlarges images in the end part areas so that a length (for example, a width) in a direction along the side is maintained, and a length (for example, a height) in a direction intersecting the side is increased. In other words, an image in the end part area TAU2 is enlarged so as to be extended upward so that an upper end of the image in the end part area TAU2 overlaps an upper end of the extraction frame EA1. In addition, an image in the end part area TAD2 is enlarged so as to be extended downward so that a lower end of the image in the end part area TAD2 overlaps a lower end of the extraction frame EA1. In an example of FIG. 14B, the CPU 410 enlarges the images in the end part areas TAU2 and TAD2 in the vertical direction so that widths are maintained, and heights are increased, thereby generating enlarged images USI2 and DSI2. In addition, a vertical magnification is set so that a size of an amended image AI2 is the same as a size of the extraction frame EA1 (FIG. 24A). As a result, there is a generation of the amended image AI2 including enlarged images USI2 and DSI2, and an image OI in an area which is not enlarged and includes the face area FA1 (FIG. 24B).

A size of the amended image AI2 generated as mentioned above is adjusted in accordance with a size of a composition target area in step S50 of FIG. 3, and the amended image AI2 whose size has been adjusted is composited in the composition target area in step S55 of FIG. 3. As a result, when the original image 16 is compared with the amended image AI2 composited in the composited image 10M, vertical magnifications from the original image 16 are different from each other between the image OI including the face area FA1 in the amended image AI2 and the enlarged images USI2 and USI2.

In other words, the amended image AI2 composited in the composited image 10M is an image in which lengths of the face 16A in the face area FA1 of the original image 16 and at least part of an area excluding the face 16A are adjusted in a specific direction at different ratios. Such an amended image AI2 is generated, and thus it is possible to generate the amended image AI2 to which an uncomfortable feeling is reduced.

(2) In the cropping process of the first illustrative embodiment, a face area FA including a face in a target image (original image) is specified (step S120 of FIG. 6), and, in the face surrounding area extraction process, a rectangular image is extracted with the face area FA as a reference (step S360 of FIG. 8). Alternatively, an object area including an object different from a face, for example, a plant, an animal, or a car, may be specified, and a rectangular image may be extracted with the object area as a reference. In the above-described manner, it is possible to generate a composited image in which an object different from a face is appropriately composited.

(3) In the first illustrative embodiment, the CPU 410 specifies a maximum inscribed rectangle ISmax of a composition target area (step S310 of FIG. 8), and specifies a circumscribed rectangle (step S320 of FIG. 8). Alternatively, the CPU 410 may specify an inscribed figure different from the maximum inscribed rectangle ISmax, for example, an inscribed circle or an inscribed triangle in accordance with a shape or the like of an object to be composited. In addition, the CPU 410 may specify a circumscribed figure different from the circumscribed rectangle, for example, a circumscribed circle or a circumscribed triangle in accordance with a shape or the like of a composition target area.

(4) In the second and third illustrative embodiments, all face areas FA in all target images are treated as candidates which are to be composited in a single composition target area (FIGS. 18 and 21). Alternatively, one or more face areas FA in a single target image may be treated as candidates which are to be composited in a single composition target area, or one face area FA (for example, a face area FA with a maximum size) in each of a plurality of target images may be treated as a candidate which is to be composited in a single composition target area.

(5) In the first illustrative embodiment, original image data is image data owned by a user, and is acquired from a storage device such as a USB memory so as to be transmitted to the server 400. Alternatively, all or some original image data may be acquired by the user optically reading an original document which is prepared by the user by using the scanner unit 250 of the multifunctional peripheral 200.

(6) In the cropping process (FIG. 6) of the embodiment, some of the process steps may be omitted as appropriate. For example, the operation mode determination (step S110) or the image type determination process (step S130) may be omitted as appropriate.

(7) In the embodiment, as illustrated in FIG. 2A, in the template image 10, the frames representing the composition target areas 15A to 15C are explicitly provided. Therefore, the composition target areas 15A to 15C can be specified by using template image data indicating the template image 10, and the composition target areas 15A to 15C can be specified by using mask image data indicating the mask image 11 (FIG. 2B). Alternatively, a template image may use an image in which frames representing composition target areas are not explicitly provided, for example, a scenery image indicated by image data owned by a user. In other words, a composition target area may not be specified by using template image data, and a composition target area may be specified by using only mask image data. In this case, an image in an area corresponding to a composition target area defined on a mask image in the scenery image is erased, and a partial image in an original image is composited in the area.

(8) In the embodiment, image processing (for example, the processes in steps S45 to S60 of FIG. 3) performed by the CPU 410 of the server 400 may be performed by apparatuses different from the server 400, for example, the CPU 210 of the multifunctional peripheral 200. In this case, for example, after a composited image is generated, the CPU 210 outputs test image data or composited image data to the printer unit 240, so that the printer unit 240 prints the test image 10T or the composited image 10M (FIGS. 17A and 17B). In addition, these image processing may be performed by a CPU (not illustrated) of the personal computer 500 (FIG. 1) connected to a printing device such as a printer. In this case, after a composited image is generated, the CPU outputs test image data or composited image data to an external printer, so that the external printer prints the test image 10T or the composited image 10M (FIGS. 17A and 17B). In other words, the output of test image data or composited image data includes not only transmission from the server 400 to a client apparatus (for example, the multifunctional peripheral 200) as in the embodiment, but also supply from the CPU 210 to the printer unit 240 inside the multifunctional peripheral 200, transmission from the personal computer 500 to an external printer, and the like.

(9) These image processing may be performed by, for example, the scanner unit 250 of the multifunctional peripheral 200, or a scanner driver which is installed in the personal computer 500 in order to control a single scanner (not illustrated). In addition, the server 400 may be configured by a single computer as in the embodiment, or may be configured by a computing system including a plurality of computers (for example, a distributed computing system realizing so-called cloud computing). For example, the server 400 may be a server system including a first apparatus which provides (transmits) UI data to the multifunctional peripheral 200 and a second apparatus which performs the image processing. In this case, for example, the process in step S10 of FIG. 3 may be performed by the first apparatus, and the processes in steps S25 to S65 of FIG. 3 may be performed by the second apparatus.

(10) In the embodiments, some configurations realized by hardware may be realized by software, and, conversely, some configurations realized by software may be realized by hardware.

The present invention provides illustrative, non-limiting examples as follows:

(1) An image processing apparatus including: a processor; and a memory storing instructions that, when executed by the processor, cause the image processing apparatus to perform: acquiring target image data indicating a target image, which is a target of an image processing, and template image data indicating a template image; specifying an object in the target image; specifying an inscribed figure inscribed in a composition target area in the template image and a circumscribed figure circumscribed to the composition target area, the composition target area having a shape different from both a shape of the inscribed figure and a shape of the circumscribed figure; calculating a size ratio between the specified inscribed figure and an area determined based on the object in the target image; setting a first area including the object to the target image based on the calculated size ratio; and generating a composited image in which an image, which is in the first area of the target image and whose size has been adjusted based on the size ratio, is composited in the composition target area in the template image, wherein the first area is set such that, when the image in the first area whose size has been adjusted based on the size ratio is superimposed on the composition target area, the object contacts with the inscribed figure and an outer edge of the first area matches an outline of the circumscribed figure.

According to the configuration, an image whose size has been adjusted based on a size ratio between an inscribed figure and an area set by using an object is composited. Accordingly, the object can be composited in an appropriate size regardless of a shape of a composition target area. In addition, an image in the first area, which is set so that the object contacts with the inscribed figure and an outer edge of the first area matches the outline of the circumscribed figure, is composited. As a result, the object can be composited at an appropriate position, and the image can be appropriately composited in the entire composition target area, regardless of a shape of the composition target area. Therefore, it is possible to appropriately composite an image including the object in the composition target area.

(2) The image processing apparatus according to (1), wherein the acquiring acquires a plurality of target image data items which includes first target image data indicating a first target image including a first object and second target image data indicating a second target image including a second object, and wherein, when the first area including the first object cannot be set within the first target image and the first area including the second object can be set within the second target image, the generating generates the composited image in which an image in the first area including the second object of the second target image is composited in the composition target area.

According to this configuration, even in a case where the first area including the first object cannot be set within the first target image, it is possible to generate an appropriate composited image by using the second target image.

(3) The image processing apparatus according to (2), wherein the instructions stored in the memory, when executed by the processor, cause the image processing apparatus to further perform: outputting candidate information of an image within which the first area can be set, the image including one or more image respectively indicated by one or more image data items among the plurality of target image data items, to prompt selection by a user.

According to this configuration, it is possible to allow the user to recognize image data appropriate for generating a composited image among a plurality of target image data items.

(4) The image processing apparatus according to (1), wherein the target image includes a plurality of objects including a third object and a fourth object, and wherein, when the first area including the third object cannot be set within the target image and the first area including the fourth object can be set within the target image, the generating generates the composited image in which an image in the first area including the fourth object of the target image is composited in the composition target area.

According to this configuration, even in a case where the first area including the third object cannot be set within the target image, it is possible to generate an appropriate composited image by using an image including the fourth object.

(5) The image processing apparatus according to (4), wherein the instructions stored in the memory, when executed by the processor, cause the image processing apparatus to further perform: outputting candidate information of an image including the object, the image including one or more images in one or more first areas which can be set within the target image, among the plurality of first areas each of which including one of the plurality of objects, to prompt selection by a user.

According to this configuration, it is possible to allow the user to recognize an object appropriate for being composited in a composition target area among a plurality of objects.

(6) The image processing apparatus according to (1), wherein the instructions stored in the memory, when executed by the processor, cause the image processing apparatus to further perform: generating, when the first area including the object cannot be set within the target image, an amended image by using a partial image included in the target image, the partial image including the object and being in an area smaller than the first area, and wherein the generating generates the composited image in which the amended image is composited in the composition target area.

According to this configuration, even in a case where the first area including the object cannot be set within the target image, it is possible to appropriately composite an image including the object in the composition target area.

(7) The image processing apparatus according to (6), wherein the amended image includes the partial image and a supplementary image which contacts with the partial image, and wherein the generating includes generating the supplementary image by using a pixel value in an area along a specific end of the partial image.

According to this configuration, it is possible to reduce an uncomfortable feeling which an amended image may have.

(8) The image processing apparatus according to (6), wherein the amended image is an image in which a length of the object in the partial image in a specific direction and a length of at least a part of an area excluding the object in the specific direction are adjusted at different ratios.

According to this configuration, it is possible to reduce an uncomfortable feeling which an amended image may have.

(9) The image processing apparatus according to any one of (1) to (8), wherein the instructions stored in the memory, when executed by the processor, cause the image processing apparatus to further perform: controlling output of the composited image data, wherein the controlling of the output of the composited image includes outputting, as the composited image data, first composited image data indicating the composited image and second composited image data indicating an image including the composited image and a blank space, wherein the first composited image data is data for printing the composited image on a first type of sheet, wherein the second composited image data is data for printing the image including the composited image and the blank space on a second type of sheet larger than the first type of sheet, and wherein a size of the composited image printed on the first type of sheet based on the first composited image data is the same as a size of the composited image printed on the second type of sheet based on the second composited image data.

According to this configuration, an image is printed on the second type of sheet by using the second composited image data, and thus content of the composited image can be appropriately confirmed without printing the composited image on the first type of sheet.

(10) The image processing apparatus according to (1), wherein the specifying of the inscribed figure is specified such that a shape of the inscribed figure is homothetic to a shape of the area determined based on the object.

(11) The image processing apparatus according to (1), wherein the setting of the first area is set based on the calculated size ratio and a distance between the specified inscribed figure and the specified circumscribed figure.

(12) A non-transitory computer-readable storage medium having a computer program stored thereon and readable by a computer of an image processing apparatus, the computer, when executed by the computer, causing the image processing apparatus to perform operations including: acquiring target image data indicating a target image, which is a target of an image processing, and template image data indicating a template image; specifying an object in the target image; specifying an inscribed figure inscribed in a composition target area in the template image and a circumscribed figure circumscribed to the composition target area, the composition target area having a shape different from both a shape of the inscribed figure and a shape of the circumscribed figure; calculating a size ratio between the specified inscribed figure and an area determined based on the object in the target image; setting a first area including the object to the target image based on the calculated size ratio; and generating a composited image in which an image, which is in the first area of the target image and whose size has been adjusted based on the size ratio, is composited in the composition target area in the template image, wherein the first area is set such that, when the image in the first area whose size has been adjusted based on the size ratio is superimposed on the composition target area, the object contacts with the inscribed figure and an outer edge of the first area matches an outline of the circumscribed figure.

What is claimed is:

1. An image processing apparatus to generate a digital postcard which is printable by a printer on a recording medium comprising:
    a processor; and
    a memory storing instructions that, when executed by the processor, cause the image processing apparatus to perform:
        acquiring target image data indicating a target image, which is a target of an image processing, and template image data indicating a digital postcard;
        specifying an object in the target image;
        calculating an aspect ratio of the object, which is a ratio of a vertical length of the object in the target image to a horizontal length of the object in the target image;

specifying an inscribed figure inscribed in a composition target area in the digital postcard, the inscribed figured having an aspect ratio equivalent to the aspect ratio of the object and having a maximum size among a plurality of figures inscribed in the composition target area in the digital postcard, and a shape of the composition target area in the digital postcard being different from a shape of the inscribed figure, calculating a size ratio between the specified inscribed figure and an area determined based on the object in the target image;

determining whether a first area including the object is capable of being extracted from the target image based on the calculated size ratio;

extracting the first area including the object from the target image based on the calculated size ratio in a case where the first area is determined to be capable of being extracted from the target image; and generating a composited image in which an image, which is in the extracted first area of the target image and whose size has been adjusted based on the size ratio, is composited in the composition target area in the digital postcard, wherein the first area is extracted such that, when the image in the first area whose size has been adjusted based on the size ratio is superimposed on the composition target area in the digital postcard, the object contacts with the inscribed figure, wherein the instructions stored in the memory, when executed by the processor, cause the image processing apparatus to further perform:

generating an amended image by using a partial image which includes the object and is in an area smaller than the first area in a case where the first area is determined to be incapable of being extracted from the target image, and wherein the generating the composited image generates the composited image in which the amended image is composited in the composition target area of the digital postcard in a case where the first area is determined to be incapable of being extracted from the target image; and sending the digital postcard including the generated composited image to a printing device for printing on a recordable medium.

2. The image processing apparatus according to claim 1, wherein the acquiring acquires a plurality of target image data items which includes first target image data indicating a first target image including a first object and second target image data indicating a second target image including a second object, and wherein, in a case where the first area is determined to be incapable of being extracted from the target image and the first area is determined to be capable of being extracted from the second target image, the generating generates the composited image in which an image in the first area, which includes the second object of the second target image, is composited in the composition target area.

3. The image processing apparatus according to claim 2, wherein the instructions stored in the memory, when executed by the processor, cause the image processing apparatus to further perform:

outputting candidate information of an image from which the first area can be extracted, the image including one or more images respectively indicated by one or more image data items among the plurality of target image data items, to prompt selection by a user.

4. The image processing apparatus according to claim 2, wherein the target image includes a plurality of objects including a third object and a fourth object, and wherein, in a case where the first area which includes the third object is determined to be incapable of being extracted from the target image and the first area which includes the fourth object is determined to be capable of being extracted from the target image, the generating generates the composited image in which an image in the first area, which includes the fourth object of the target image, is composited in the composition target area.

5. The image processing apparatus according to claim 4, wherein the instructions stored in the memory, when executed by the processor, cause the image processing apparatus to further perform:

outputting candidate information of an image including the object, the image including one or more images in one or more first areas which are capable of being extracted from the target image, among the one or more first areas each of which including one of the plurality of objects, to prompt selection by a user.

6. The image processing apparatus according to claim 1, wherein the amended image includes the partial image and a supplementary image which contacts the partial image, and wherein the generating includes generating the supplementary image by using a pixel value in an area along a specific end of the partial image.

7. The image processing apparatus according to claim 1, wherein the amended image is an image in which a length of the object in the partial image in a specific direction and a length of at least a part of an area excluding the object in the specific direction are adjusted at different ratios.

8. The image processing apparatus according to claim 1, wherein the instructions stored in the memory, when executed by the processor, cause the image processing apparatus to further perform:

controlling output of the composited image, wherein the controlling of the output of the composited image includes outputting, as composited image data, first composited image data indicating the composited image and second composited image data indicating an image including the composited image and a blank space, wherein the first composited image data is data for printing the composited image on a first type of sheet, wherein the second composited image data is data for printing the image including the composited image and the blank space on a second type of sheet larger than the first type of sheet, and wherein a size of the composited image printed on the first type of sheet based on the first composited image data is the same as a size of the composited image printed on the second type of sheet based on the second composited image data.

9. The image processing apparatus according to claim 1, wherein the instructions stored in the memory, when executed by the processor, cause the image processing apparatus to further perform:

specifying a circumscribed figure circumscribed to the composition target area, the shape of the composition target area being different from the shape of the circumscribed figure, and wherein the extracting of the first area is extracted based on the calculated size ratio and a distance between the specified inscribed figure and the specified circumscribed figure.

10. The image processing apparatus according to claim 1, wherein the instructions stored in the memory, when executed by the processor, cause the image processing apparatus to further perform:
specifying a circumscribed figure circumscribed to the composition target area, the shape of the composition target area being different from the shape of the circumscribed figure,
wherein an outer edge of the first area matches an outline of the circumscribed figure.

11. The image processing apparatus according to claim 1, wherein the first area is determined to be incapable of being extracted from the target image in a case where at least a portion of the first area is not included in the target image.

12. A non-transitory computer-readable storage medium having a computer program stored thereon and readable by a computer of an image processing apparatus, the computer program, when executed by the computer, causing the image processing apparatus to generate a digital postcard which is printable on a recording medium by performing operations comprising:
acquiring target image data indicating a target image, which is a target of an image processing, and template image data indicating a digital postcard;
specifying an object in the target image;
calculating an aspect ratio of the object, which is a ratio of a vertical length of the object in the target image to a horizontal length of the object in the target image;
specifying an inscribed figure inscribed in a composition target area in the digital postcard, the inscribed figured having an aspect ratio equivalent to the aspect ratio of the object and having a maximum size among a plurality of figures inscribed in the composition target area in the digital postcard, and a shape of the composition target area in the digital postcard being different from a shape of the inscribed figure,
calculating a size ratio between the specified inscribed figure and an area determined based on the object in the target image;
determining whether a first area including the object is capable of being extracted from the target image based on the calculated size ratio;
extracting the first area including the object from the target image based on the calculated size ratio in a case where the first area is determined to be capable of being extracted from the target image; and
generating a composited image in which an image, which is in the extracted first area of the target image and whose size has been adjusted based on the size ratio, is composited in the composition target area in the digital postcard,
wherein the first area is extracted such that, when the image in the first area whose size has been adjusted based on the size ratio is superimposed on the composition target area in the digital postcard, the object contacts with the inscribed figure,
wherein the computer program, when executed by the computer, causes the image processing apparatus to further perform:
generating an amended image by using a partial image which includes the object and is in an area smaller than the first area in a case where the first area is determined to be incapable of being extracted from the target image, and
wherein the generating the composited image generates the composited image in which the amended image is composited in the composition target area of the digital postcard in a case where the first area is determined to be incapable of being extracted from the target image; and
sending the digital postcard including the generated composited image to a printing device for printing on a recordable medium.

* * * * *